United States Patent
Takagi et al.

(10) Patent No.: US 12,209,672 B2
(45) Date of Patent: Jan. 28, 2025

(54) VALVE DEVICE

(71) Applicant: DENSO CORPORATION, Kariya (JP)

(72) Inventors: Kousei Takagi, Kariya (JP); Tadashi Ikemoto, Kariya (JP); Naohito Seko, Kariya (JP)

(73) Assignee: DENSO CORPORATION, Kariya (JP)

( * ) Notice: Subject to any disclaimer, the term of this patent is extended or adjusted under 35 U.S.C. 154(b) by 11 days.

(21) Appl. No.: 17/972,810

(22) Filed: Oct. 25, 2022

(65) Prior Publication Data

US 2023/0050115 A1 Feb. 16, 2023

Related U.S. Application Data

(63) Continuation of application No. PCT/JP2021/016485, filed on Apr. 23, 2021.

(30) Foreign Application Priority Data

Apr. 28, 2020 (JP) .................................. 2020-079505

(51) Int. Cl.
*F16K 11/085* (2006.01)
*F01P 5/10* (2006.01)
(Continued)

(52) U.S. Cl.
CPC ............ *F16K 11/0856* (2013.01); *F01P 5/10* (2013.01); *F01P 7/14* (2013.01); *F01P 2007/146* (2013.01); *F01P 7/165* (2013.01); *F16K 5/0689* (2013.01); *F16K 5/201* (2013.01); *F16K 11/0873* (2013.01)

(58) Field of Classification Search
CPC .. F16K 11/0856; F16K 5/201; F16K 11/0873; F16K 5/0689; F01P 5/10; F01P 7/14; F01P 2007/146; F01P 7/165
See application file for complete search history.

(56) References Cited

U.S. PATENT DOCUMENTS 10,458,562 B2 * 10/2019 Ozeki .................... F16K 31/041
2013/0263949 A1 * 10/2013 Bartnick ............. F16K 11/0856
137/625

(Continued)

FOREIGN PATENT DOCUMENTS

JP 2017-8847 1/2017

*Primary Examiner* — Craig M Schneider
*Assistant Examiner* — Christopher D Ballman
(74) *Attorney, Agent, or Firm* — Nixon & Vanderhye P.C.

(57) ABSTRACT

A valve, which is rotated about a rotational axis, includes a valve outer peripheral portion. The valve outer peripheral portion has a valve inflow port for supplying fluid to a flow passage of the valve outer peripheral portion and valve outflow ports for discharging the fluid from the flow passage. The valve outflow ports include: a main outflow port which is configured to communicate with a whole of a seat opening of a valve seat; and a plurality of intermediate outflow ports, each of which is configured to communicate with a portion of the seat opening. An axial dimension of each intermediate outflow port, which is measured in an axial direction of the rotational axis, is smaller than an axial dimension of the seat opening, which is measured in the axial direction. The axial dimension of each intermediate outflow port is progressively changed in a circumferential direction.

4 Claims, 15 Drawing Sheets

(51) Int. Cl.
*F01P 7/14* (2006.01)
*F01P 7/16* (2006.01)
*F16K 5/06* (2006.01)
*F16K 5/20* (2006.01)
*F16K 11/087* (2006.01)

(56) References Cited

U.S. PATENT DOCUMENTS

| | | | |
|---|---|---|---|
| 2016/0281585 A1* | 9/2016 | Muizelaar | F16K 11/165 |
| 2017/0009894 A1 | 1/2017 | Seko et al. | |
| 2018/0335153 A1* | 11/2018 | Ozeki | F16K 5/0485 |
| 2018/0340618 A1 | 11/2018 | Seko et al. | |
| 2019/0186641 A1 | 6/2019 | Seko et al. | |
| 2019/0292976 A1 | 9/2019 | Ozeki et al. | |
| 2020/0109787 A1 | 4/2020 | Tsuji | |
| 2020/0109788 A1* | 4/2020 | Ikemoto | F16K 31/041 |
| 2020/0114725 A1 | 4/2020 | Kanzaki | |
| 2020/0300375 A1 | 9/2020 | Ikemoto et al. | |
| 2021/0088149 A1 | 3/2021 | Nomura | |
| 2021/0301930 A1 | 9/2021 | Seko et al. | |

\* cited by examiner

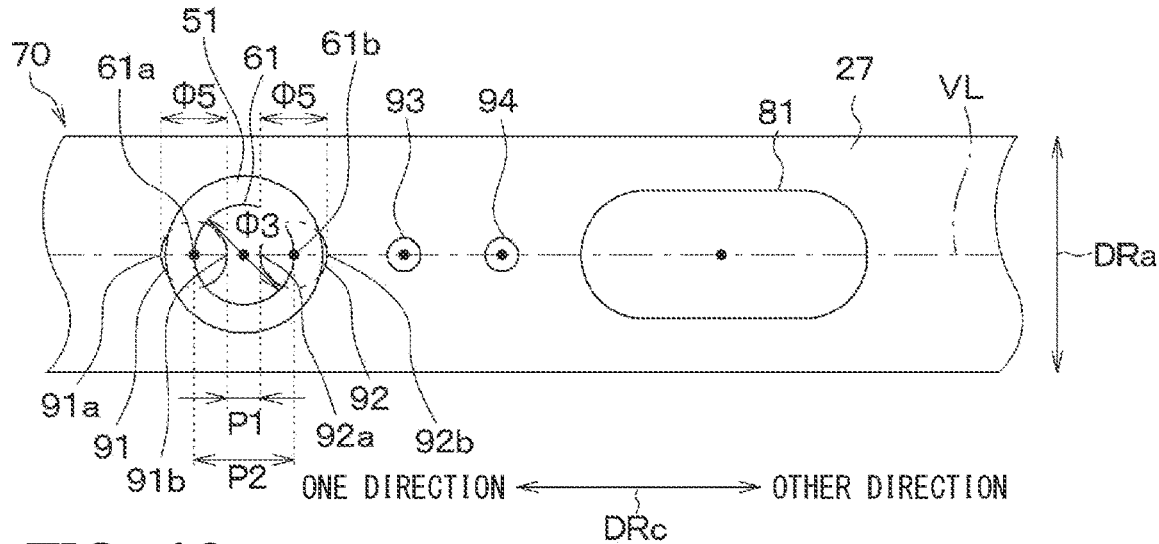
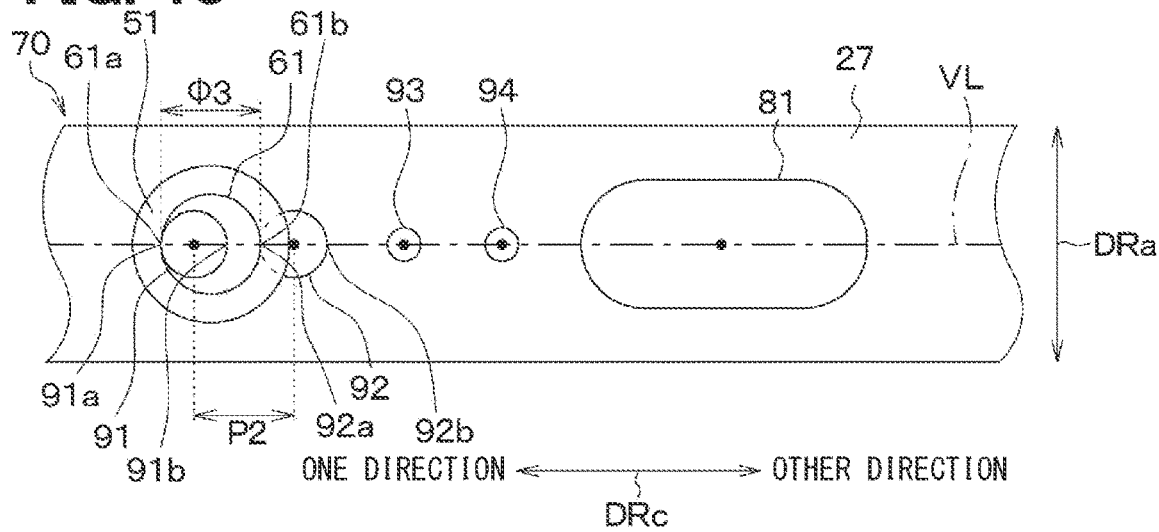
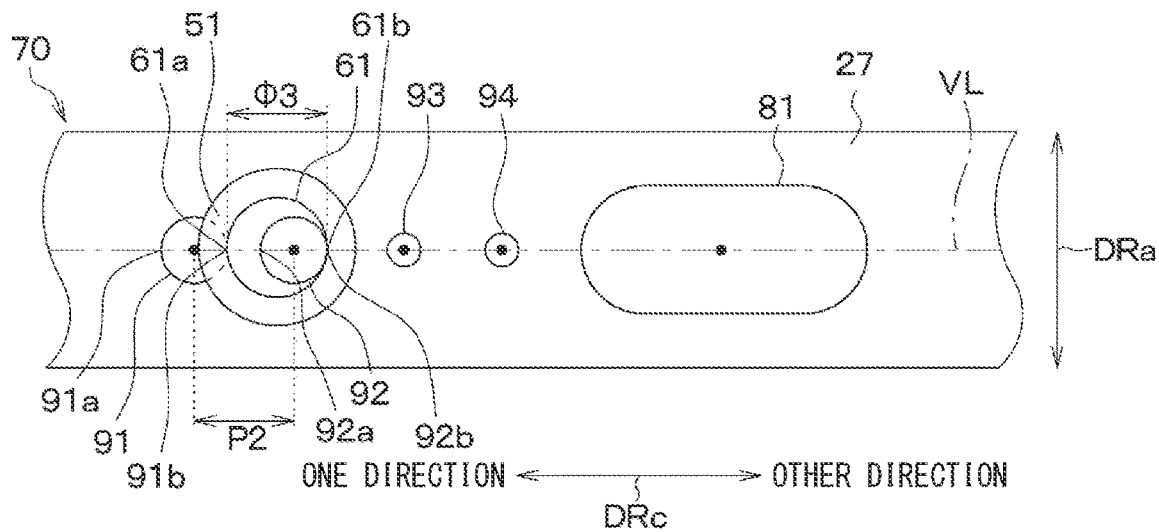

VALVE DEVICE

CROSS REFERENCE TO RELATED APPLICATIONS

This application is a continuation application of International Patent Application No. PCT/JP2021/016485 filed on Apr. 23, 2021, which designated the U.S. and claims the benefit of priority from Japanese Patent Application No. 2020-79505 filed on Apr. 28, 2020. The entire disclosures of all of the above applications are incorporated herein by reference.

TECHNICAL FIELD

The present disclosure relates to a valve device.

BACKGROUND

Previously, there has been proposed a valve device that includes: a ball valve that has a valve opening formed at a ball surface thereof which is shaped in a form of curved surface; a valve seat that has a seat opening formed at a seat surface thereof which is shaped in a form of curved surface; and a shaft that is rotated integrally with the ball valve. The valve opening is an oblong hole that has a pair of opening edges, which extend in a rotational direction of the ball valve, and an axial dimension of the valve opening, which is measured in the axial direction of the shaft, is larger than an inner diameter of the seat opening.

SUMMARY

This section provides a general summary of the disclosure, and is not a comprehensive disclosure of its full scope or all of its features.

According to the present disclosure, there is provided a valve device that includes a valve, a housing and a valve seat. The valve includes a valve outer peripheral portion. The valve outer peripheral portion is shaped in a tubular form and forms a flow passage configured to conduct fluid at an inside of the valve outer peripheral portion, and the valve is configured to be rotated about a rotational axis in a circumferential direction of the valve outer peripheral portion. The housing receives the valve and has a fluid inlet, which is configured to receive the fluid, and a fluid outlet, which is configured to discharge the fluid. The valve seat is placed between the valve outer peripheral portion and the fluid outlet and is configured to close a gap between the valve outer peripheral portion and the fluid outlet. The valve seat has a seat opening that is formed at a seat surface of the valve seat while at least a portion of the seat surface is configured to slide along the valve outer peripheral portion when the valve is rotated. The valve outer peripheral portion has a plurality of intermediate outflow ports, each of which is configured to communicate with a portion of the seat opening in the valve opening state of the valve. The plurality of intermediate outflow ports are arranged one after another in the circumferential direction.

BRIEF DESCRIPTION OF DRAWINGS

The drawings described herein are for illustrative purposes only of selected embodiments and not all possible implementations, and are not intended to limit the scope of the present disclosure.

FIG. 12 is an explanatory diagram for explaining an outflow port pitch according to the first embodiment.

FIG. 13 is an explanatory diagram for explaining an interval between a first intermediate port and a second intermediate port according to the first embodiment.

FIG. 14 is an explanatory diagram for explaining the interval between the first intermediate port and the second intermediate port according to the first embodiment.

DETAILED DESCRIPTION

Figure 1:
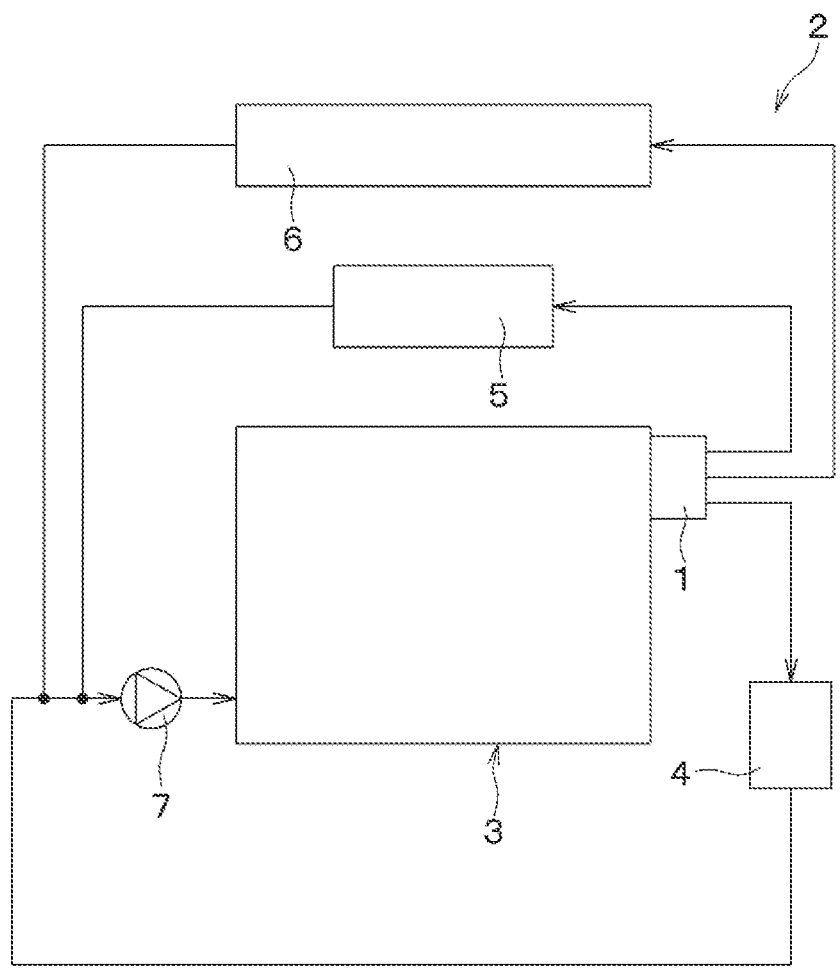
FIG. 1 is a schematic view of a cooling system, to which a valve device according to a first embodiment is applied.

Previously, there has been proposed a valve device that includes: a ball valve that has a valve opening formed at a ball surface thereof which is shaped in a form of curved surface; a valve seat that has a seat opening formed at a seat surface thereof which is shaped in a form of curved surface; and a shaft that is rotated integrally with the ball valve. The valve opening is an oblong hole that has a pair of opening edges, which extend in a rotational direction of the ball valve, and an axial dimension of the valve opening, which is measured in the axial direction of the shaft, is larger than an inner diameter of the seat opening. Therefore, when the ball valve is rotated, the valve opening can be more easily communicated with the seat opening in comparison to a case where the valve opening is shaped in a circle. Furthermore, the valve opening can be communicated with a whole of the seat opening at the valve opening time.

A radius of curvature of the seat surface is larger than a radius of curvature of the ball surface. Therefore, a portion of the seat surface, which is provided to ensure a required degree of sealing through contact with the ball surface at the valve closing time, does not contact the ball surface at the valve opening time. Thus, wearing of the portion of the seat surface, which is provided to ensure the required degree of sealing through contact with the ball surface at the valve closing time, is limited, and thereby the required degree of sealing is ensured at the valve seat.

The inventors of the present application have studied the valve device of the previously proposed valve device discussed above to let it function as a flow rate regulating valve by adding an opening, which is configured to communicate with a portion of the seat opening, to the ball surface and thereby adjusting a flow rate of the discharged fluid by changing the opening communicated with the seat opening among the openings of the ball valve. The opening (i.e., the additional opening), which is added during the study of the inventors, is an oblong hole that has a pair of opening edges, which extend in the rotational direction of the ball valve, while an axial dimension of the additional opening measured in the axial direction of the shaft is smaller than the inner diameter of the seat opening.

However, a portion of the seat surface, which is configured to ensure the required degree of sealing through contact with the ball surface at the valve closing time and is overlapped with the additional opening in the circumferential direction, does not contact the ball surface when the additional opening is communicated with the seat opening. In contrast, another portion of the seat surface, which is configured to ensure the required degree of sealing through contact with the ball surface at the valve closing time and is not overlapped with the additional opening in the circumferential direction, contacts the ball surface. Therefore, when the ball valve rotates repeatedly at the location where the additional opening is communicated with the seat opening, the seat surface will have a difference in the amount of wear between an overlapping portion of the seat surface (i.e., a portion overlapped with the additional opening in the circumferential direction) and a non-overlapping portion of the seat surface (i.e., a portion not overlapped with the additional opening in the circumferential direction) while the overlapping portion is located on an inner side of the pair of opening edges, and the non-overlapping portion is located on an outer side of the pair of opening edges. Furthermore, the difference in the amount of wear discussed above is increased when the size of the additional opening measured in the circumferential direction is increased. As a result, the inventors have found that it is difficult to ensure the required degree of sealing of the valve seat.

According to one aspect of the present disclosure, there is provided a valve device including:

a valve that includes a valve outer peripheral portion, wherein the valve outer peripheral portion is shaped in a tubular form and forms a flow passage configured to conduct fluid at an inside of the valve outer peripheral portion, and the valve is configured to be rotated about a rotational axis in a circumferential direction of the valve outer peripheral portion;

a housing that receives the valve and has a fluid inlet, which is configured to receive the fluid, and a fluid outlet, which is configured to discharge the fluid, wherein the fluid inlet and the fluid outlet are placed to oppose the valve outer peripheral portion; and a valve seat that is placed between the valve outer peripheral portion and the fluid outlet and is configured to close a gap between the valve outer peripheral portion and the fluid outlet, wherein:

the valve outer peripheral portion has:

a valve inflow port which is placed to oppose the fluid inlet and is configured to supply the fluid, which is received from the fluid inlet, to the flow passage; and a plurality of valve outflow ports which are arranged one after another in the circumferential direction at an axial location of the valve outer peripheral portion opposed to the fluid outlet and are respectively configured to discharge the fluid, which is supplied into the flow passage, to the fluid outlet;

the valve seat has a seat opening that is formed at a seat surface of the valve seat while at least a portion of the seat surface is configured to slide along the valve outer peripheral portion when the valve is rotated, wherein the seat opening is configured to discharge the fluid to the fluid outlet when the seat opening is communicated with at least one of the plurality of valve outflow ports;

the valve is displaceable through rotation of the valve in the circumferential direction between a valve opening state, in which the at least one of the plurality of valve outflow ports is communicated with the seat opening, and a valve closing state, in which the plurality of valve outflow ports are not communicated with the seat opening;

the plurality of valve outflow ports include:

a main outflow port which is configured to communicate with a whole of the seat opening in the valve opening state of the valve; and a plurality of intermediate outflow ports, each of which is configured to communicate with a portion of the seat opening in the valve opening state of the valve; and the plurality of intermediate outflow ports are arranged one after another in the circumferential direction, wherein an axial dimension of each of the plurality of intermediate outflow ports, which is measured in an axial direction of the rotational axis, is smaller than an axial dimension of the seat opening, which is measured in the axial direction, and the axial dimension of at least a portion of each of the plurality of intermediate outflow ports, which is placed to overlap with the seat opening in the circumferential direction, is progressively changed in the circumferential direction.

According to the above aspect, in the valve device, when the main outflow port and the seat opening are communicated with each other, the fluid is discharged from the fluid outlet after passing through a whole of the seat opening. Furthermore, in the valve device, when one of the intermediate outflow ports and the seat opening are communicated with each other, the fluid passes through a portion of the seat opening. In this case, in the valve device, the flow rate of the fluid, which is discharged from the fluid outlet, is reduced in comparison to the case where the main outflow port and the seat opening are communicated with each other.

Therefore, in the valve device, the flow rate of the fluid, which is discharged from the fluid outlet in the valve opening state, can be adjusted by changing the valve outflow port, which is communicated with the seat opening, among the main outflow port and the intermediate outflow ports by rotating the valve in the circumferential direction.

Furthermore, when the valve is rotated within a range, in which the one of the intermediate outflow ports overlaps with the seat opening in the radial direction, a portion of the seat surface, which contacts the valve outer peripheral portion, changes along a contour of the one of the intermediate outflow ports in response to the rotation of the valve. Therefore, when the valve is rotated at the position where the one of the intermediate outflow ports is communicated with the seat opening, it is possible to limit generation of the difference in the amount of wear between an overlapping portion of the seat surface, which overlaps with the intermediate outflow port, and a non-overlapping portion of the seat surface, which does not overlap with the intermediate outflow port. Thus, the required degree of sealing of the valve seat can be ensured.

Hereinafter, embodiments of the present disclosure will be described with reference to the drawings. In the following embodiments, the same reference signs may be assigned to portions that are the same as or equivalent to those described in the preceding embodiment(s), and the description thereof may be omitted. Further, when only a portion of any one of the components is described in the embodiment(s), the description of the component described in the preceding embodiment can be applied to the rest of the component. The following embodiments may be partially combined with each other as long as the combination does not cause any trouble, even if not explicitly stated.

First Embodiment (Overview of Valve Device 1)

A first embodiment will be described with reference to FIGS. 1 to 19. A valve device 1 of the present embodiment is applied to a cooling system 2 that circulates coolant for cooling an engine 3 of a vehicle. The valve device 1 controls a flow rate of the coolant circulated in the cooling system 2. The coolant, which is referred to in the present specification, is, for example, a fluid (more specifically a liquid) containing ethylene glycol as a main component. Any other type of fluid may be used as the fluid of the present disclosure.

As shown in FIG. 1, the cooling system 2 includes the valve device 1, the engine 3, an air conditioning heat exchanger 4, an oil cooler 5, a radiator 6 and a water pump 7. The valve device 1 outputs a required flow rate of the coolant to each of the air conditioning heat exchanger 4, the oil cooler 5 and the radiator 6 when the coolant is circulated by the water pump 7 after the coolant is heated by passing through the engine 3.

Figure 2:
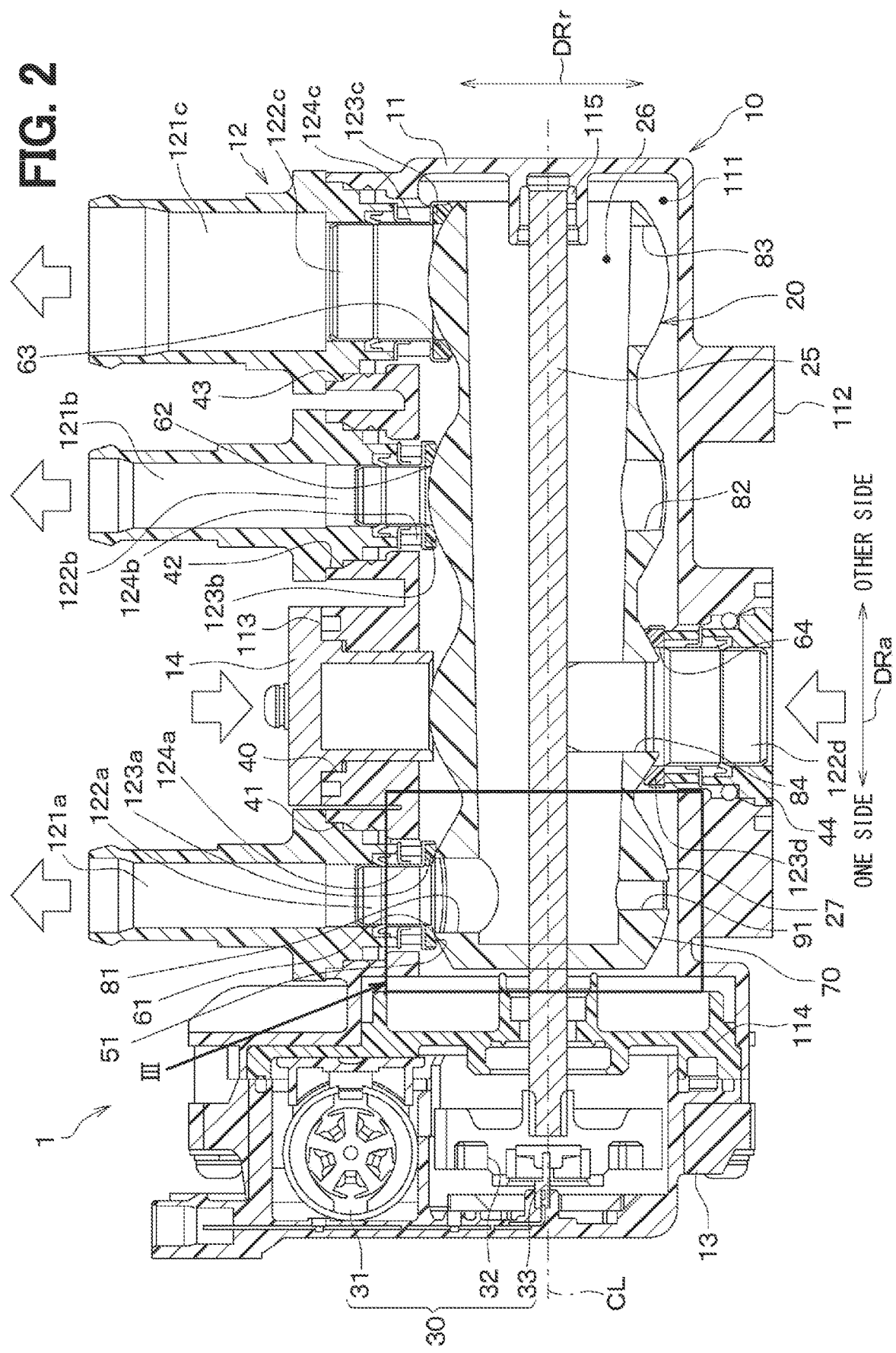
FIG. 2 is a schematic view showing a structure of the valve device of the first embodiment.

As shown in FIG. 2, the valve device 1 includes: a housing 10 which forms an outer shell of the valve device 1; a valve 20 which is configured to be rotated about a rotational axis CL; a shaft 25 which is configured to rotate the valve 20; and a drive unit 30 which is configured to output a drive force for rotating the shaft 25. The valve device 1 is constructed as a rotary valve that executes an opening and closing operation of the valve device 1 and adjustment of the flow rate of the coolant outputted from the valve device 1 through rotation of the valve 20 about the rotational axis CL. In the present embodiment, for the purpose of explaining various constituent portions, a direction, which is along the rotational axis CL, is defined as an axial direction DRa, and a direction, which is perpendicular to the axial direction DRa and is radiated from the rotational axis CL, is defined as a radial direction DRr, and a circumferential direction of the valve outer peripheral portion 70 of the valve 20, which is a rotational direction of the valve 20, is defined as a circumferential direction DRc.

The housing 10 is a receiving portion that receives the valve 20. The housing 10 is made of, for example, a resin member. The housing 10 includes: a housing main body 11 which is shaped in a hollow form and receives the valve 20; a pipe member 12 which is configured to discharge the coolant from the housing main body 11; and a drive unit cover 13 which receives the drive unit 30.

The housing main body 11 is shaped in a bottomed cup form that has an opening and a generally rectangular cuboid outer shape. Furthermore, a valve receiving space 111, which is shaped in a cylindrical form having a central axis extending in the axial direction DRa, is formed at an inside of the housing main body 11 by an outer wall of the housing main body 11. The housing main body 11 is opened toward one side in the axial direction DRa.

The drive unit cover 13 is installed to the outer wall of the housing main body 11 at the opening of the housing main body 11. The housing main body 11 has an engine mounting surface 112 for mounting the engine 3 and a pipe mounting surface 113 for mounting the pipe member 12. Each of the engine mounting surface 112 and the pipe mounting surface 113 is formed at a corresponding location placed in the radial direction DRr at the outer wall of the housing main body 11. The engine mounting surface 112 and the pipe mounting surface 113 are opposite to each other in the radial direction DRr. Furthermore, a first bearing portion 114, which rotatably supports one end portion of the shaft 25, is installed at one end portion of the inside of the housing main body 11 which faces the one side in the axial direction DRa. Furthermore, a second bearing portion 115, which rotatably supports the other end portion of the shaft 25, is installed at the other end portion of the inside of the housing main body 11 which faces the other side in the axial direction DRa.

The drive unit cover 13 is a receiving portion that receives the drive unit 30. The drive unit cover 13 is shaped in a hollow form and is made of a resin member. Furthermore, the drive unit cover 13 closes the valve receiving space 111 when the drive unit cover 13 is installed to the opening of the housing main body 11.

The drive unit 30 is a drive source that outputs a drive force for rotating the shaft 25. The drive unit 30 includes: an electric motor 31 which outputs a rotational force for rotating the valve 20; a gear unit 32 which transmits the output of the electric motor 31 to the shaft 25; and a rotational angle sensor 33 which senses a rotational position of the shaft 25. The electric motor 31 is connected to an undepicted electronic control unit (hereinafter referred to as ECU) and is rotated based on a control signal transmitted from the ECU. The rotational angle sensor 33 is connected to the undepicted ECU and transmits information about the sensed rotational position of the shaft 25 to the ECU.

The pipe mounting surface 113 is a generally planar surface. A first inlet 40, through which the coolant is supplied to the valve receiving space 111, is formed at the pipe mounting surface 113. Furthermore, a first outlet 41, a second outlet 42 and a third outlet 43, through which the coolant is discharged from the valve receiving space 111, are formed at the pipe mounting surface 113. Each of the first inlet 40, the first outlet 41, the second outlet 42 and the third outlet 43 has a circular opening and is formed at a corresponding location that is opposed to the valve outer peripheral portion 70. The first inlet 40, the first outlet 41, the second outlet 42 and the third outlet 43 are arranged in the axial direction DRa. The pipe member 12 is installed to the pipe mounting surface 113. In the present embodiment, the first inlet 40 and a second inlet 44 described later respectively form a fluid inlet, and the first outlet 41 forms a fluid outlet.

The pipe member 12 is a member for discharging the coolant, which is supplied into the valve receiving space 111, to the air conditioning heat exchanger 4, the oil cooler 5 and the radiator 6. The pipe member 12 is formed by, for example, a resin member. The pipe member 12 forms flow passages that conduct the coolant discharged from the valve 20.

Specifically, the pipe member 12 includes: a first pipe portion 121a which conducts the coolant toward the air conditioning heat exchanger 4; a second pipe portion 121b which conducts the coolant toward the oil cooler 5; and a third pipe portion 121c which conducts the coolant toward the radiator 6. Furthermore, the pipe member 12 includes: a first sleeve 122a that conducts the coolant, which is discharged from the valve 20, to the first pipe portion 121a; a second sleeve 122b that conducts the coolant, which is discharged from the valve 20, to the second pipe portion 121b; and a third sleeve 122c that conducts the coolant, which is discharged from the valve 20, to the third pipe portion 121c.

The first pipe portion 121a is coupled to the first sleeve 122a. The air conditioning heat exchanger 4 is connected to a downstream side of the first pipe portion 121a in a flow direction of the coolant. The second pipe portion 121b is coupled to the second sleeve 122b. The oil cooler 5 is connected to a downstream side of the second pipe portion 121b in the flow direction of the coolant. The third pipe portion 121c is coupled to the third sleeve 122c. The radiator 6 is connected to a downstream side of the third pipe portion 121c in the flow direction of the coolant.

The first sleeve 122a is installed between the valve 20 and the first outlet 41. The first sleeve 122a forms a flow passage that conducts the coolant, which is discharged from the valve 20, to the first pipe portion 121a. The second sleeve 122b is installed between the valve 20 and the second outlet 42. The second sleeve 122b forms a flow passage that conducts the coolant, which is discharged from the valve 20, to the second pipe portion 121b. The third sleeve 122c is installed between the valve 20 and the third outlet 43. The third sleeve 122c forms a flow passage that conducts the coolant, which is discharged from the valve 20, to the third pipe portion 121c.

As shown in FIG. 2, the first sleeve 122a includes: a first valve seat 123a that closes a gap between the first outlet 41 and the valve outer peripheral portion 70; and a first spring 124a that urges the first valve seat 123a against the valve outer peripheral portion 70. The second sleeve 122b includes: a second valve seat 123b that closes a gap between the second outlet 42 and the valve outer peripheral portion 70; and a second spring 124b that urges the second valve seat 123b against the valve outer peripheral portion 70. The third sleeve 122c includes: a third valve seat 123c that closes a gap between the third outlet 43 and the valve outer peripheral portion 70; and a third spring 124c that urges the third valve seat 123c against the valve outer peripheral portion 70.

The first to third sleeves 122a-122c have a basically identical structure. Therefore, in the present embodiment, the first sleeve 122a, which corresponds to the first outlet 41, will be described in detail, and the description of the second sleeve 122b and the third sleeve 122c will be omitted.

Figure 3:
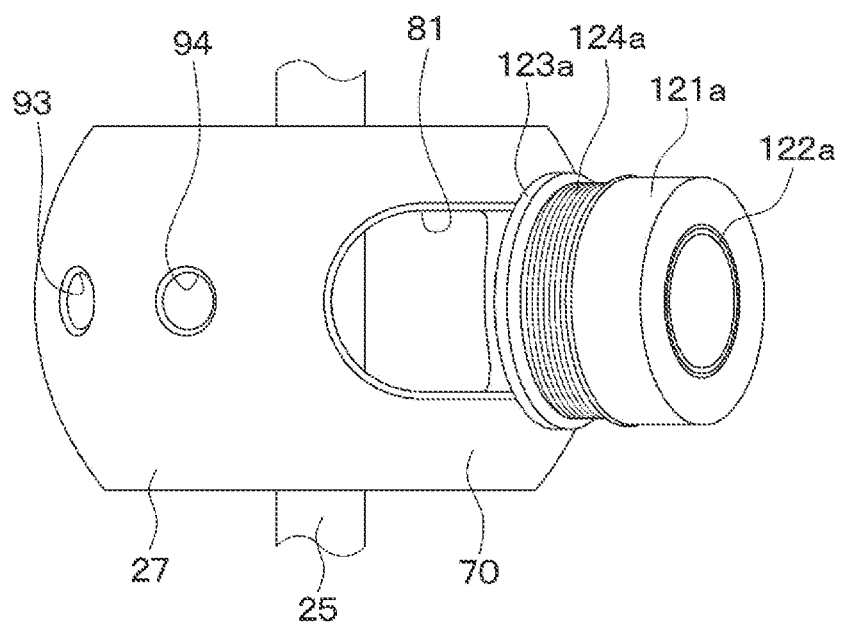
FIG. 3 is a schematic view showing a part of a valve and a first sleeve according to the first embodiment.
Figure 4:
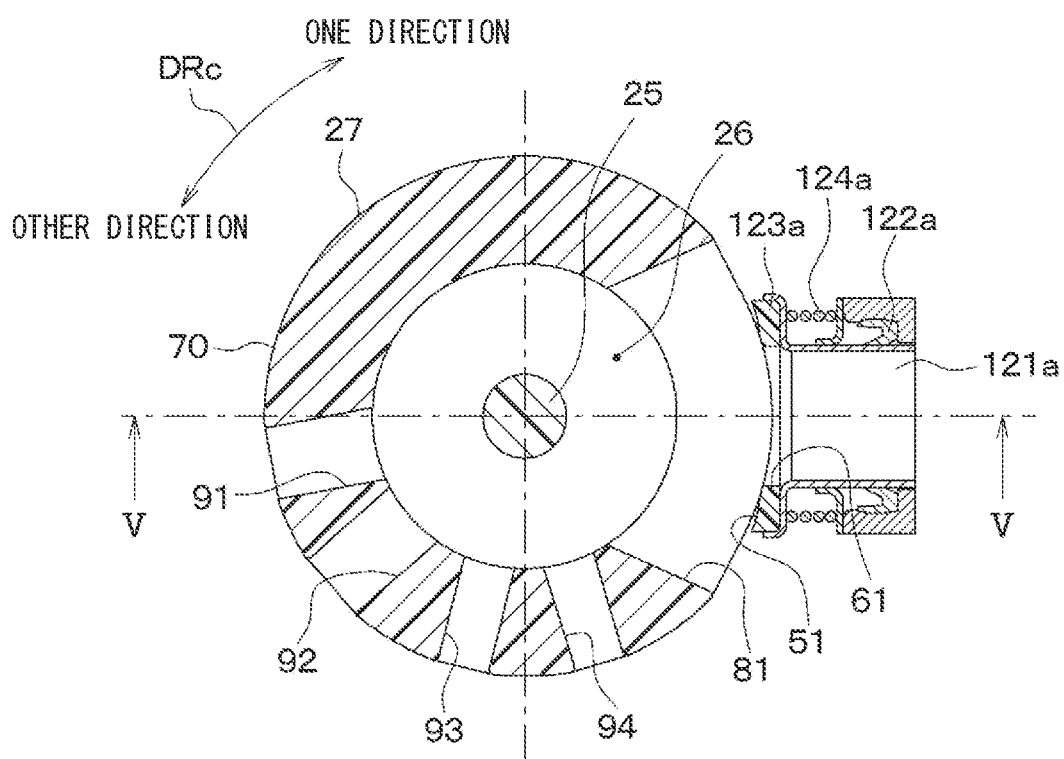
FIG. 4 is a schematic cross-sectional view showing the part of the valve and the first sleeve according to the first embodiment.
Figure 5:
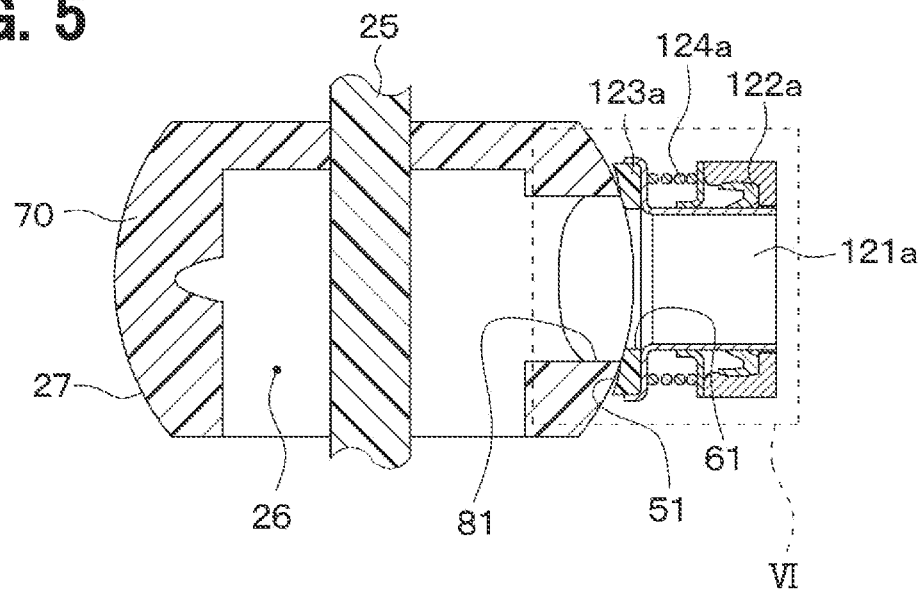
FIG. 5 is a cross-sectional view taken along line V-V in FIG. 4.

The first valve seat 123a is a seal member that limits leakage of the coolant through the gap between the first outlet 41 and the valve outer peripheral portion 70. As shown in FIGS. 3 to 5, the first valve seat 123a is shaped in a circular ring form. The first valve seat 123a is provided to an end portion of the first sleeve 122a located on the valve 20 side. The first valve seat 123a has a first seat surface 51 that slides along the valve outer peripheral portion 70 when the valve 20 is rotated. The first seat surface 51 of the first valve seat 123a is shaped in a form of curved surface, a center of which is recessed toward the outer side in the radial direction DRr.

A first opening 61 extends through a center of the first valve seat 123a to discharge the coolant, which is discharged from the valve 20, to the first outlet 41. The first opening 61 is communicated with the first outlet 41. In the present embodiment, the first valve seat 123a serves as a valve seat. The first seat surface 51 serves as a seat surface. The first opening 61 serves as a seat opening. Furthermore, in the following description, an opening, which is formed at the seat surface of the second valve seat 123b and is communicated with the second outlet 42, will be also referred to as a second opening 62. Also, an opening, which is formed at the seat surface of the third valve seat 123c and is communicated with the third outlet 43, will be also referred to as a third opening 63.

The engine mounting surface 112 is a generally planar surface. The second inlet 44, through which the coolant is supplied to the valve receiving space 111, is formed at the engine mounting surface 112. The second inlet 44 is formed at a location that is opposed to the valve outer peripheral portion 70. The second inlet 44 has a circular opening and is formed at a location that is opposite to the first inlet 40 in the radial direction DRr. Furthermore, a fourth sleeve 122d, which conducts the coolant received from the second inlet 44 to a valve inflow port 84, is installed to the second inlet 44.

The fourth sleeve 122d has a structure that is similar to each of the first to third sleeves 122a-122c, so that the description of the fourth sleeve 122d will be omitted.

Hereinafter, an opening, which is formed at the seat surface of the fourth valve seat 123d provided to the fourth sleeve 122d and is communicated with the second inlet 44, will be also referred to as a fourth opening 64. Centers of the first to fourth openings 61-64 overlap in the axial direction DRa.

The shaft 25 is a rotatable member that is rotated about a central axis of the shaft 25 by the drive force outputted from the drive unit 30. The shaft 25 is placed at a location where the central axis of the shaft 25 coincides with the rotational axis CL. The shaft 25 extends in the axial direction DRa. Furthermore, the shaft 25 extends through the valve 20 and is joined to the valve 20. The shaft 25 is rotated integrally with the valve 20.

The one end portion of the shaft 25 is connected to the gear unit 32. The other end portion of the shaft 25 is rotatably supported by the second bearing portion 115. When the drive force of the electric motor 31 is transmitted to the shaft 25 through the gear unit 32, the shaft 25 is rotated in the circumferential direction DRc.

(Overview of Valve 20)

The valve 20 is a regulating valve that is rotated integrally with the shaft 25 to adjust the flow rate of the coolant, which is supplied through each of the first inlet 40 and the second inlet 44, and the flow rate of the coolant, which is discharged through each of the first outlet 41, the second outlet 42 and the third outlet 43. The valve 20 adjusts the flow rate of the coolant, which is discharged from the first outlet 41, to adjust the flow rate of the coolant supplied to the air conditioning heat exchanger 4. Furthermore, the valve 20 adjusts the flow rate of the coolant, which is discharged from the second outlet 42, to adjust the flow rate of the coolant supplied to the oil cooler 5. Also, the valve 20 adjusts the flow rate of the coolant, which is discharged from the third outlet 43, to adjust the flow rate of the coolant supplied to the radiator 6.

Figure 6:
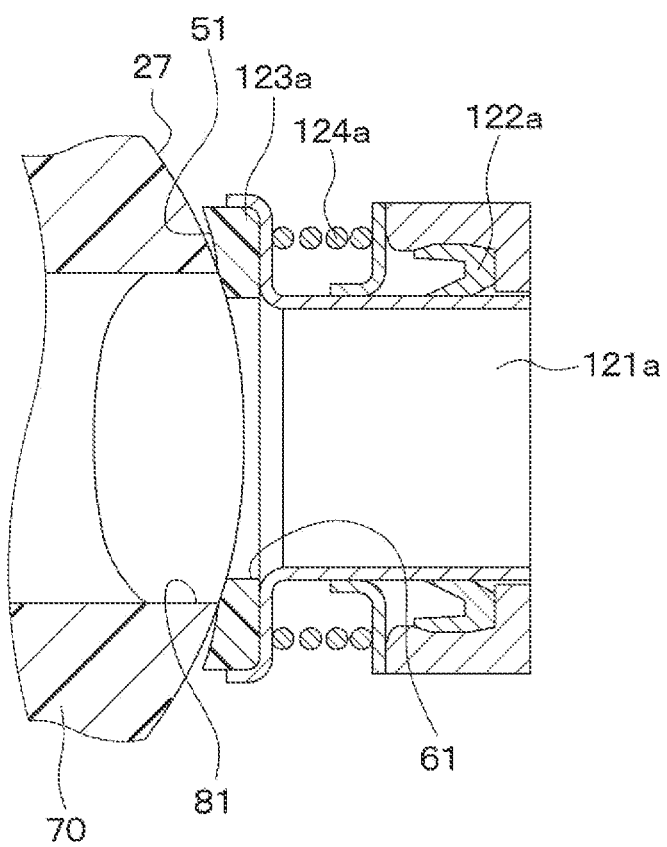
FIG. 6 is an explanatory diagram for explaining a radius of curvature of a valve outer peripheral portion and a radius of curvature of the first sleeve according to the first embodiment.

The valve 20 includes the valve outer peripheral portion 70 which forms the outer shell of the valve 20. The valve outer peripheral portion 70 is shaped in a bottomed tubular form, one side of which is closed, and the valve outer peripheral portion 70 forms a flow passage 26 that conducts the coolant at the inside of the valve outer peripheral portion 70. The shaft 25 is joined to the bottom of the valve outer peripheral portion 70. Furthermore, portions of the valve outer peripheral portion 70, which are opposed to the first to fourth openings 61-64, are respectively shaped in a form of curved surface that is convexly curved toward the outer side in the radial direction DRr. For example, as shown in FIG. 6, the portion of the valve outer peripheral portion 70, which is opposed to the first seat surface 51, is shaped in the form of curved surface that has a radius of curvature smaller than a radius of curvature of the first seat surface 51. Furthermore, the valve outer peripheral portion 70 has a closing surface 27 that is configured to close the first inlet 40, the first outlet 41, the second outlet 42, the third outlet 43 and the second inlet 44.

A positioning portion (not shown), which limits the rotation of the valve 20, is formed at the valve outer peripheral portion 70. A rotational range of the valve 20 is limited when the positioning portion abuts against a stopper (not shown) which is formed at the housing 10. In the present embodiment, a predetermined rotational position of the valve 20 is defined as a reference angle, and the valve 20 is configured to rotate within the range, which is from the reference angle to the point, at which the positioning portion abuts against the stopper. Specifically, the reference angle is set to be 0°, and the valve 20 is rotatable toward one side and the other side in the circumferential direction DRc within a range of 0° to 240°. Hereinafter, the direction of rotating from 0° to 240° in the circumferential direction DRc is referred to as one direction, and the direction of rotating from 240° to 0° in the circumferential direction DRc is referred to as the other direction.

Furthermore, the valve inflow port 84, which supplies the coolant received from the first inlet 40 and the second inlet 44 to the flow passage 26, is formed at the valve outer peripheral portion 70. Furthermore, a main outflow port 81, a first intermediate port 91, a second intermediate port 92, a third intermediate port 93, a fourth intermediate port 94, a second outflow port 82 and a third outflow port 83, which are configured to discharge the coolant supplied into the flow passage 26 through the valve inflow port 84 to the outside of the valve 20, are formed at the valve outer peripheral portion 70.

The valve inflow port 84 is set such that a position of the valve inflow port 84 of the valve outer peripheral portion 70 in the axial direction DRa coincides with a position of the first inlet 40 and the second inlet 44 of the housing main body 11 in the axial direction DRa. In other words, the valve inflow port 84 is formed at the position where the valve inflow port 84 can be opposed to each of the first inlet 40 and the second inlet 44. When the valve inflow port 84 overlaps with the first inlet 40 in the radial direction DRr after the rotation of the valve 20, the valve inflow port 84 is communicated with the first inlet 40. Furthermore, when the valve inflow port 84 overlaps with the fourth opening 64 in the radial direction DRr after the rotation of the valve 20, the valve inflow port 84 is communicated with the fourth opening 64.

Each of the main outflow port 81 and the first to fourth intermediate ports 91-94 is a flow outlet, through which the coolant supplied to the flow passage 26 is discharged to the air conditioning heat exchanger 4 through the first outlet 41. In the present embodiment, each of the main outflow port 81 and the first to fourth intermediate ports 91-94 serves as a valve outflow port, through which the coolant supplied to the flow passage 26 is discharged to the first outlet 41.

A position of each of the main outflow port 81 and the first to fourth intermediate ports 91-94 along the valve outer peripheral portion 70 in the axial direction DRa coincides with a position of the first outlet 41 of the housing main body 11 in the axial direction DRa. The main outflow port 81 and the first to fourth intermediate ports 91-94 are arranged in the circumferential direction DRc at the location that can be opposed to the first outlet 41. Furthermore, each of the first to fourth intermediate ports 91-94 is located at the position where at least a portion of each of the first to fourth intermediate ports 91-94 can overlap with the first opening 61 in the circumferential direction DRc. In the present embodiment, each of the first to fourth intermediate ports 91-94 is located at the position where a whole of each of the first to fourth intermediate ports 91-94 can overlap with the first opening 61 in the circumferential direction DRc.

Furthermore, each of the main outflow port 81 and the first to fourth intermediate ports 91-94 can be communicated with the first opening 61 when the port 81, 91-94 overlaps with the first opening 61 in the radial direction DRr upon the rotation of the valve 20. Here, the term "communicated" refers to a state where two different spaces are communicated with each other to enable flow of the coolant between the two different spaces. For example, when the first opening 61 is communicated with the main outflow port 81, at least a portion of the space surrounded by the first opening 61 is communicated with at least a portion of the space surrounded by the main outflow port 81 to enable flow of the coolant between the first opening 61 and the main outflow port 81. Furthermore, when the first opening 61 is communicated with the main outflow port 81, the first opening 61 is placed in an open state (i.e., a valve opening state).

Furthermore, for example, when the first opening 61 is communicated with the first intermediate port 91, at least a portion of the space surrounded by the first opening 61 is communicated with at least a portion of the space surrounded by the first intermediate port 91 to enable flow of the coolant between the first opening 61 and the first intermediate port 91. In the present embodiment, each of the first to fourth intermediate ports 91-94 serves as an intermediate outflow port that is configured to communicate with a portion of the first opening 61 in the valve opening state of the valve 20.

The second outflow port 82 is a flow outlet, through which the coolant supplied to the flow passage 26 is discharged to the oil cooler 5 through the second outlet 42. A position of the second outflow port 82 along the valve outer peripheral portion 70 in the axial direction DRa coincides with a position of the second outlet 42 of the housing main body 11 in the axial direction DRa. When the second outflow port 82 overlaps with the second opening 62 in the radial direction DRr after the rotation of the valve 20, the second outflow port 82 is communicated with the second opening 62.

The third outflow port 83 is a flow outlet, through which the coolant supplied to the flow passage 26 is discharged to the radiator 6 through the third outlet 43. A position of the third outflow port 83 along the valve outer peripheral portion 70 in the axial direction DRa coincides with a position of the third outlet 43 of the housing main body 11 in the axial direction DRa. When the third outflow port 83 overlaps with the third opening 63 in the radial direction DRr after the rotation of the valve 20, the third outflow port 83 is communicated with the third opening 63.

The valve 20 is placed in the valve opening state when at least one of the main outflow port 81, the first to fourth intermediate ports 91-94, the second outflow port 82 and the third outflow port 83 is communicated with the corresponding at least one opening placed to oppose the at least one of the main outflow port 81, the first to fourth intermediate ports 91-94, the second outflow port 82 and the third outflow port 83 at the time of supplying the coolant from the valve inflow port 84 to the flow passage 26. Furthermore, when the valve 20 is placed in the valve opening state, the valve device 1 discharges the coolant from the corresponding at least one opening, which is communicated with the at least one of the main outflow port 81, the first to fourth intermediate ports 91-94, the second outflow port 82 and the third outflow port 83.

Furthermore, the valve 20 is placed in a valve closing state when all of the main outflow port 81, the first to fourth intermediate ports 91-94, the second outflow port 82 and the third outflow port 83 are not communicated with any one of the openings. When the valve 20 is placed in the valve closing state, the valve device 1 stops the discharge of the coolant. The valve 20 adjusts the flow rate of the coolant discharged from the valve 20 by displacing the valve 20 between the valve opening state and the valve closing state through the rotation of the valve 20.

In the cooling system 2, the required flow rate of the coolant, which is required to be supplied to the air conditioning heat exchanger 4, the oil cooler 5 and the radiator 6, is predetermined. Therefore, the dimensions of each of the main outflow port 81, the first to fourth intermediate ports 91-94, the second outflow port 82 and the third outflow port 83 are set such that the required flow rate of the coolant, which is required to be supplied to the air conditioning heat exchanger 4, the oil cooler 5 and the radiator 6, is discharged from the valve 20. Furthermore, the dimensions of each of the first to third openings 61-63 are set based on the dimensions of the corresponding one of the main outflow port 81, the second outflow port 82 and the third outflow port 83.

Furthermore, the required flow rate of the coolant and the timing of discharging the coolant to be supplied to each of the air conditioning heat exchanger 4, the oil cooler 5 and the radiator 6 are not always constant. Therefore, it is desirable that the valve 20 is configured to discharge the required flow rate of the coolant at the required timing to each corresponding one of the air conditioning heat exchanger 4, the oil cooler 5 and the radiator 6 according to, for example, an operational state of the vehicle.

In the present embodiment, the valve device 1 can discharge the required flow rate of the coolant at the required timing to each corresponding one of the air conditioning heat exchanger 4, the oil cooler 5 and the radiator 6 by adjusting the rotational position of the valve 20. Specifically, the dimensions and the shape of each of the main outflow port 81, the first to fourth intermediate ports 91-94, the second outflow port 82 and the third outflow port 83 are set based on the flow rate of the coolant to be discharged from the first to third outlets 41-43 relative to the predetermined rotational position of the valve 20. Furthermore, the valve device 1 can change the flow rate of the coolant to be discharged to the air conditioning heat exchanger 4 by changing the flow outlet communicated with the first opening 61 to one of the main outflow port 81 and the first to fourth intermediate ports 91-94.

In the following description, the shape of each of the main outflow port 81, the first to fourth intermediate ports 91-94, the second outflow port 82, the third outflow port 83 and the valve inflow port 84 will be described, and thereafter the location of each of the main outflow port 81, the first to fourth intermediate ports 91-94, the second outflow port 82, the third outflow port 83 and the valve inflow port 84 will be described.

(Shapes of Main Outflow Port 81, First to Fourth Intermediate Ports 91-94, Second Outflow Port 82, Third Outflow Port 83 and Valve Inflow Port 84)

Figure 7:
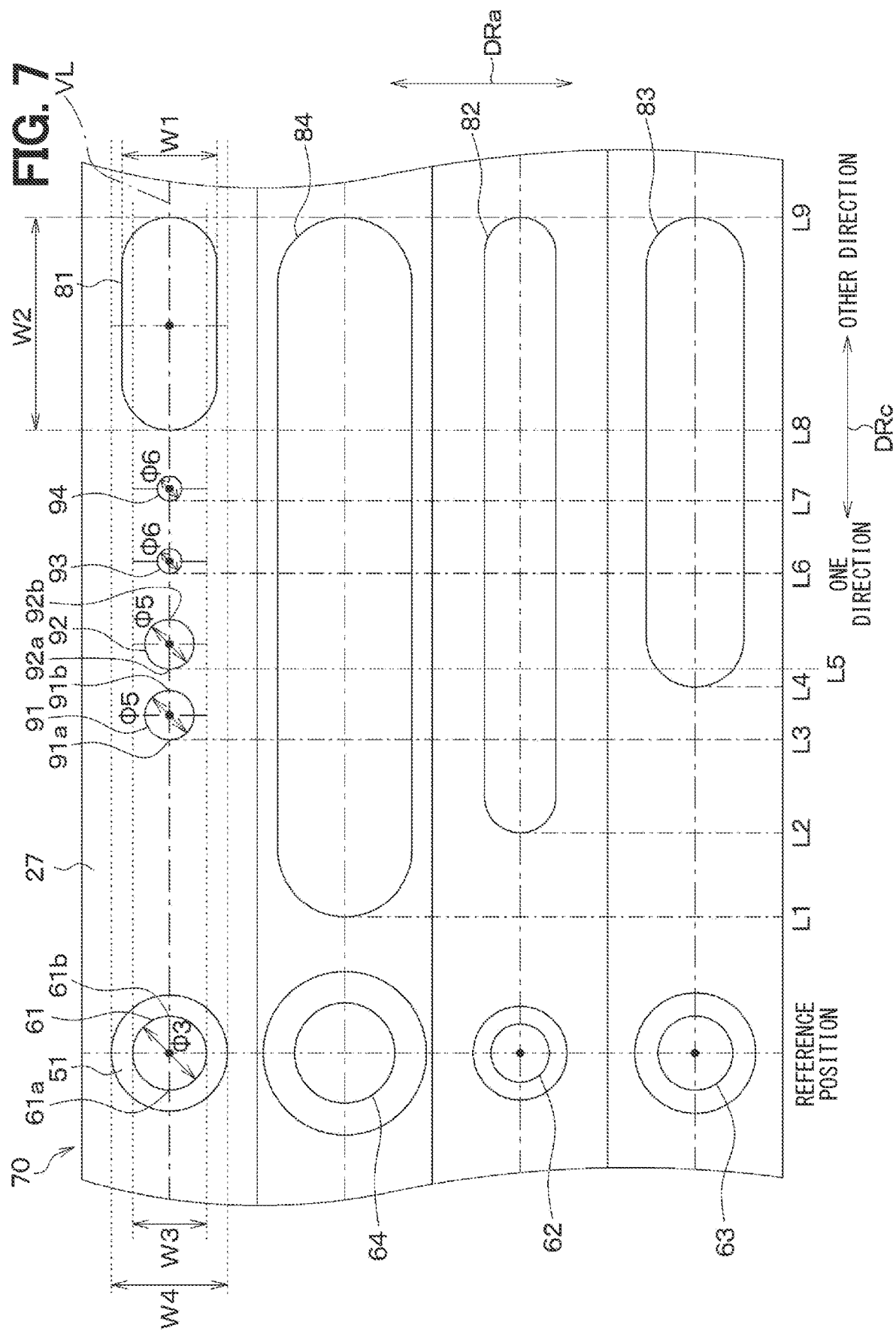
FIG. 7 is an unfolded view where an outer peripheral surface of the valve outer peripheral portion is unfolded into a plane, indicating first to fourth openings of the valve outer peripheral portion according to the first embodiment.

The shape of each of the main outflow port 81, the first to fourth intermediate ports 91-94, the second outflow port 82, the third outflow port 83 and the valve inflow port 84 will be described with reference to FIG. 7. In an unfolded view shown in FIG. 7 and the other drawings where an outer peripheral surface of the valve outer peripheral portion 70 is unfolded into a plane, the first opening 61 is indicated to describe the dimensions of each of the main outflow port 81 and the first to fourth intermediate ports 91-94 and the dimension of the first opening 61. Furthermore, the second opening 62 is also indicated to describe the dimensional relationship between the second outflow port 82 and the second opening 62. Also, the third opening 63 is indicated to describe the dimensional relationship between the third outflow port 83 and the third opening 63. Additionally, the fourth opening 64 is indicated to describe the dimensional relationship between the valve inflow port 84 and the fourth opening 64.

Each of the main outflow port 81, the second outflow port 82, the third outflow port 83 and the valve inflow port 84 is shaped in a form of oblong hole where a circumferential dimension, which is measured in the circumferential direction DRc, is larger than an axial dimension, which is measured in the axial direction DRa. However, the axial dimension measured in the axial direction DRa and the circumferential dimension measured in the circumferential direction DRc of each of the main outflow port 81, the second outflow port 82, the third outflow port 83 and the valve inflow port 84 are different from those of the rest of the main outflow port 81, the second outflow port 82, the third outflow port 83 and the valve inflow port 84. Each of the main outflow port 81, the second outflow port 82, the third outflow port 83 and the valve inflow port 84 is shaped to have a pair of straight lines, which are opposed to each other in the axial direction DRa and extend in the circumferential direction DRc, and a pair of arcs, which are joined to the pair of straight lines and are opposed to each other in the circumferential direction DRc.

The axial dimension W1 of the main outflow port 81, which is measured in the axial direction DRa, is larger than the axial dimension W3 of the first opening 61, which is measured in the axial direction DRa. In other words, the axial dimension W1 of the main outflow port 81, which is measured in the axial direction DRa, is larger than an inner diameter φ3 of the first opening 61 that is shaped in a circle. Furthermore, the axial dimension W1 of the main outflow port 81, which is measured in the axial direction DRa, is smaller than the axial dimension W4 of the first seat surface 51, which is measured in the axial direction DRa. Also, the circumferential dimension W2 of the main outflow port 81, which is measured in the circumferential direction DRc, is larger than the inner diameter φ3 of the first opening 61.

The main outflow port 81, which is formed in the above-described manner, can be communicated with the whole of the first opening 61 when the main outflow port 81 is communicated with the first opening 61 to place the valve 20 in the valve opening state. Specifically, the main outflow port 81 can cover the entire range which is surrounded by the first seat surface 51. A maximum range of the main outflow port 81, which can be communicated with the first opening 61, is the entire range of the first opening 61.

The axial dimension of the second outflow port 82 measured in the axial direction DRa and the circumferential dimension of the second outflow port 82 measured in the circumferential direction DRc are larger than the inner diameter of the second opening 62. The axial dimension of the third outflow port 83 measured in the axial direction DRa and the circumferential dimension of the third outflow port 83 measured in the circumferential direction DRc are larger than the inner diameter of the third opening 63. The axial dimension of the valve inflow port 84 measured in the axial direction DRa and the circumferential dimension of the valve inflow port 84 measured in the circumferential direction DRc are larger than the inner diameter of the fourth opening 64.

In contrast, each of the first to fourth intermediate ports 91-94 is shaped in a circle. The axial dimension of each of the first to fourth intermediate ports 91-94 measured in the axial direction DRa and the circumferential dimension of each of the first to fourth intermediate ports 91-94 measured in the circumferential direction DRc are smaller than the axial dimension W3 of the first opening 61 measured in the axial direction DRa. In other words, the axial dimension of each of the first to fourth intermediate ports 91-94 measured in the axial direction DRa and the circumferential dimension of each of the first to fourth intermediate ports 91-94 measured in the circumferential direction DRc are smaller than the inner diameter φ3 of the first opening 61.

An opening cross-sectional area of each of the first intermediate port 91 and the second intermediate port 92 is 50% of an opening cross-sectional area of the first opening 61. An opening cross-sectional area of each of the third intermediate port 93 and the fourth intermediate port 94 is 25% of the opening cross-sectional area of the first opening 61. A diameter φ5 of each of the first intermediate port 91 and the second intermediate port 92 is smaller than an inner diameter φ3 of the first opening 61. A diameter φ6 of each of the third intermediate port 93 and the fourth intermediate port 94 is smaller than the inner diameter φ3 of the first opening 61 and the diameter φ5 of the first intermediate port 91.

The axial dimension of each of the first to fourth intermediate ports 91-94 measured in the axial direction DRa is progressively changed in the circumferential direction DRc. Specifically, the axial dimension of each of the first to fourth intermediate ports 91-94 measured in the axial direction DRa is progressively decreased in the circumferential direction DRc from a location of the intermediate port 91-94, at which the axial dimension measured in the axial direction DRa is maximum, to another location of the intermediate port 91-94, at which the axial dimension measured in the axial direction DRa is minimum.

Specifically, the axial dimension of each of the first to fourth intermediate ports 91-94 measured in the axial direction DRa is progressively decreased in the circumferential direction DRc from a center of the intermediate port 91-94, which is centered in the circumferential direction DRc, to each of one end and the other end of the intermediate port 91-94, which are opposite to each other in the circumferential direction DRc.

Each of the first to fourth intermediate ports 91-94, which are configured in the above-described manner, can be communicated with only a portion of the first opening 61 when the intermediate port 91-94 is communicated with the first opening 61 to place the valve 20 in the valve opening state. Since the opening cross-sectional area of each of the first to fourth intermediate ports 91-94 is smaller than the opening cross-sectional area of the first opening 61, the first opening 61 cannot be fully opened. In contrast, when the first opening 61 is communicated with a predetermined intermediate port among the first to fourth intermediate ports 91-94, the first opening 61 can be communicated with the whole of the predetermined intermediate port.

Furthermore, when each of the main outflow port 81, the first to fourth intermediate ports 91-94, the second outflow port 82, the third outflow port 83 and the valve inflow port 84 is communicated with the corresponding opening 61-64, an open range of the opening 61-64, which is actually opened, can be expressed as an open ratio. Specifically, the open ratio of each of the first to fourth openings 61-64 is an open degree of the opening 61-64, which is actually opened.

When the main outflow port 81 is communicated with the whole of the first opening 61, the open ratio of the first opening 61 is 100% (specifically, placed in a full opening state). When the second outflow port 82 is communicated with the whole of the second opening 62, the open ratio of the second opening 62 is 100%. When the third outflow port 83 is communicated with the whole of the third opening 63, the open ratio of the third opening 63 is 100%. When the valve inflow port 84 is communicated with the whole of the fourth opening 64, the open ratio of the fourth opening 64 is 100%.

Furthermore, when the whole of the first intermediate port 91 is communicated with the first opening 61, or the whole of the second intermediate port 92 is communicated with the first opening 61, the open ratio of the first opening 61 is 50%. Furthermore, when the whole of the third intermediate port 93 is communicated with the first opening 61, or the whole of the fourth intermediate port 94 is communicated with the first opening 61, the open ratio of the first opening 61 is 25%.

Furthermore, when each of the first to fourth openings 61-64 is closed by the closing surface 27, the open ratio of the opening 61-64 is 0% (i.e., placed in a full closing state).

Figure 8:
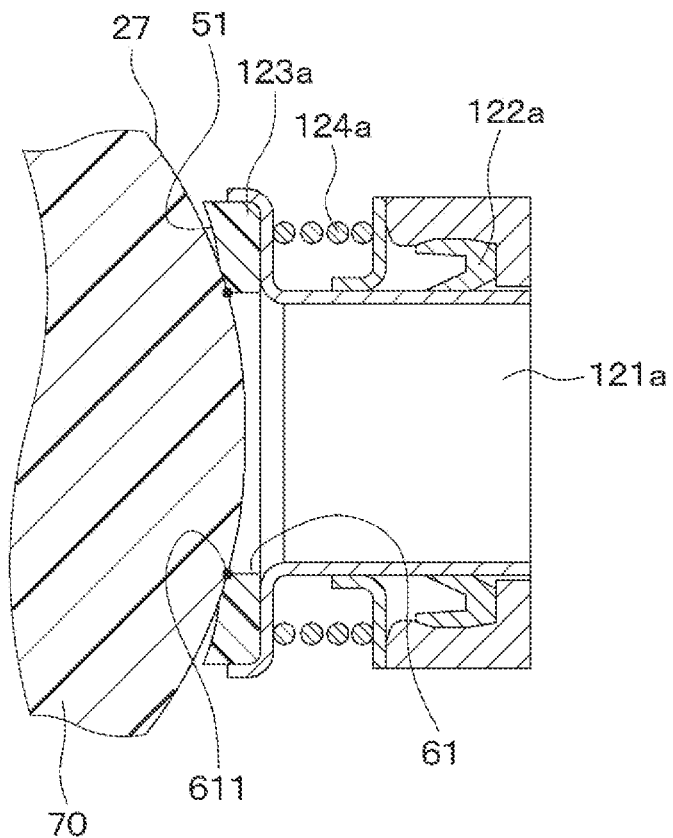
FIG. 8 is a cross-sectional view showing a full closing state of the first opening according to the first embodiment.
Figure 9:
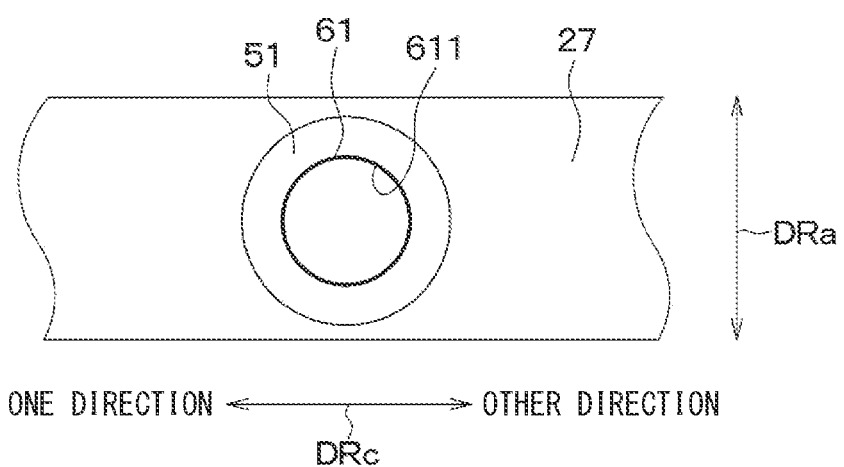
FIG. 9 is a diagram for explaining a sliding portion between a first seat surface and a closing surface according to the first embodiment.

A radius of curvature of a portion of the valve 20, which is opposed to the first seat surface 51, is smaller than a radius of curvature of the first seat surface 51. Therefore, in a case where the first opening 61 is closed by the closing surface 27 to place the valve 20 in the valve closing state, an opening edge 611, which is an annular peripheral edge of the first opening 61, contacts the closing surface 27 along an entire perimeter of the opening edge 611, as shown in FIGS. 8 and 9. Specifically, the opening edge 611 contacts the closing surface 27 along the entire range of the opening edge 611, which surrounds the first opening 61, so that a required degree of sealing between the first valve seat 123a and the closing surface 27 is ensured.

Figure 10:
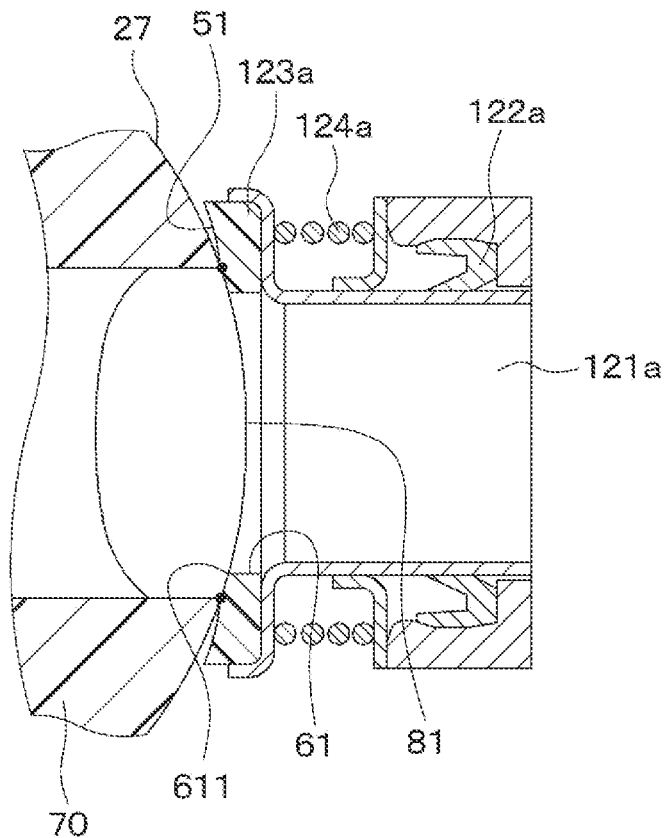
FIG. 10 is a cross-sectional view showing a full opening state of the first opening according to the first embodiment.
Figure 11:
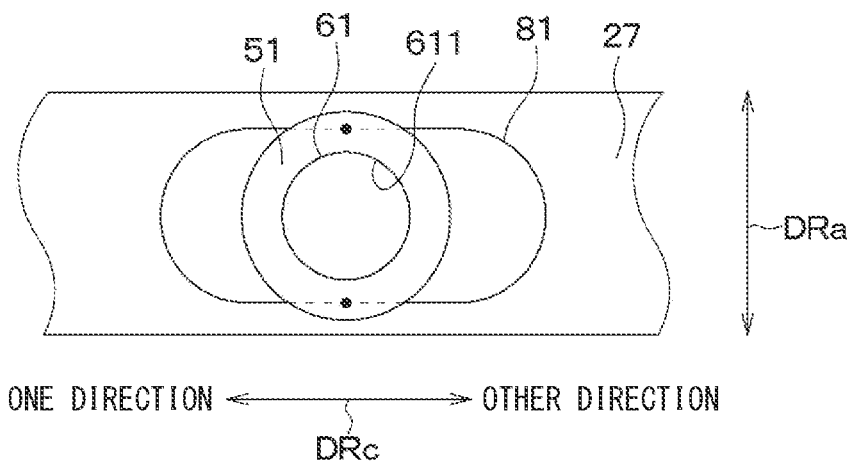
FIG. 11 is a diagram for explaining the sliding portion between the first seat surface and the closing surface at the time of fully opening the first opening according to the first embodiment.

In contrast, in the case where the first opening 61 is placed in the full opening state, as shown in FIGS. 10 and 11, two portions of the first seat surface 51, each of which is on the outer side of the opening edge 611 in the radial direction of the first opening 61 and overlaps with the edge of the main outflow port 81 in the axial direction DRa, contacts the closing surface 27.

(Locations of Main Outflow Port 81, First to Fourth Intermediate Ports 91-94, Second Outflow Port 82, Third Outflow Port 83 and Valve Inflow Port 84)

The valve 20 adjusts the flow rate of the coolant, which is discharged from corresponding each of the first to third outlets 41-43, when the coolant is supplied from the valve inflow port 84 into the flow passage 26. Therefore, the valve inflow port 84 is configured to overlap with at least a portion of each of the main outflow port 81, the first to fourth intermediate ports 91-94, the second outflow port 82 and the third outflow port 83 in the axial direction DRa. In the present embodiment, the valve inflow port 84 overlaps with the entire range of each of the main outflow port 81, the first to fourth intermediate ports 91-94, the second outflow port 82 and the third outflow port 83 in the axial direction DRa.

Furthermore, the valve 20 discharges the coolant from the second outlet 42 and the third outlet 43 while the valve 20 discharges the coolant from the first outlet 41. Therefore, each of the second outflow port 82 and the third outflow port 83 is configured to overlap with at least a portion of each of the main outflow port 81 and the first to fourth intermediate ports 91-94 in the axial direction DRa. In the present embodiment, the second outflow port 82 overlaps with the entire range of each of the main outflow port 81 and the first to fourth intermediate ports 91-94 in the axial direction DRa. The third outflow port 83 overlaps with the entire range of each of the main outflow port 81 and the second to fourth intermediate ports 92-94 in the axial direction DRa. However, the third outflow port 83 does not overlap with the entire range of the first intermediate port 91 in the axial direction DRa.

The main outflow port 81, the first to fourth intermediate ports 91-94, the second outflow port 82, the third outflow port 83 and the valve inflow port 84 are configured such that each of the first to fourth openings 61-64 opens at a timing that is different from the rest of the first to fourth openings 61-64 at the time of rotating the valve 20 from 0° in the one direction. In the present embodiment, the main outflow port 81, the first to fourth intermediate ports 91-94, the second outflow port 82, the third outflow port 83 and the valve inflow port 84 are configured such that the fourth opening 64, the second opening 62, the first opening 61 and the third opening 63 are opened in this order.

Each adjacent two of the main outflow port 81 and the first to fourth intermediate ports 91-94 are spaced from each other by a predetermined corresponding interval. Furthermore, the center of each of the main outflow port 81 and the first to fourth intermediate ports 91-94 overlaps with the center of the first opening 61 in the circumferential direction DRc. Also, the main outflow port 81 and the first to fourth intermediate ports 91-94 are arranged such that when the valve 20 is rotated from 0° in the one direction, the first intermediate port 91, the second intermediate port 92, the third intermediate port 93, the fourth intermediate port 94 and the main outflow port 81 are sequentially communicated with the first opening 61 in this order.

Here, a point of the valve outer peripheral portion 70, which overlaps with the center of the first opening 61 in the radial direction DRr when the rotational position of the valve 20 is 0°, is defined as a reference position of the valve outer peripheral portion 70. The rotational position of the valve 20 indicates a rotational angle of the valve 20 at the time of rotating the valve 20 from the reference angle in the one direction.

The valve inflow port 84 is located closer to the reference position in comparison to the main outflow port 81, the first to fourth intermediate ports 91-94, the second outflow port 82 and the third outflow port 83. The valve inflow port 84 is formed in a range that extends from a position, which is spaced from the reference position by a distance L1 in one direction, to a position, which is spaced from the reference position by a distance L9 in the one direction. The distance L9 is longer than the distance L1.

The second outflow port 82 is formed in a range that extends from a position, which is spaced from the reference position by a distance L2 in the one direction, to the position, which is spaced from the reference position by the distance L9 in the one direction. The third outflow port 83 is formed in a range that extends from a position, which is spaced from the reference position by a distance L4 in the one direction, to the position, which is spaced from the reference position by the distance L9 in the one direction. The distance L2 and the distance L4 is longer than the distance L1 and is shorter than the distance L9. The distance L4 is longer than the distance L2.

The first intermediate port 91 is spaced from the reference position by a distance L3 in the one direction. The distance L3 is longer than the distance L2 and is shorter than the distance L4. The second intermediate port 92 is spaced from the reference position by a distance L5 in the one direction. The distance L5 is longer than the distance L4 and is shorter than the distance L9.

The third intermediate port 93 is spaced from the reference position by a distance L6 in the one direction. The fourth intermediate port 94 is spaced from the reference position by a distance L7 in the one direction. The distance L7 is longer than the distance L6 and is shorter than the distance L9. The main outflow port 81 is formed in a range that extends from a position, which is spaced from the reference position by a distance L8 in the one direction, to the position, which is spaced from the reference position by the distance L9 in the one direction. The distance L8 is longer than the distance L7 and is shorter than the distance L9.

Next, intervals of the main outflow port 81 and the first to fourth intermediate ports 91-94 will be described with reference to FIGS. 12 to 16. First of all, an interval between the first intermediate port 91 and the second intermediate port 92, which are adjacent to each other, will be described with reference to FIGS. 12 to 14. One end of the first intermediate port 91 located on the one side in the one direction will be referred to as a first one-side end 91a, and one end of the second intermediate port 92 located on the one side in the one direction will be referred to as a second one-side end 92a. Also, one end of the first opening 61 located on the one side in the one direction will be referred to as a one-side seat end 61a. Furthermore, the other end of the first intermediate port 91 located on the other side in the other direction will be referred to as a first other-side end 91b, and the other end of the second intermediate port 92 located on the other side in the other direction will be referred to as a second other-side end 92b. Also, the other end of the first opening 61 located on the other side in the other direction will be referred to as an other-side seat end 61b.

Furthermore, an interval between a portion of the first intermediate port 91 and a portion of the second intermediate port 92, which overlap with each other in the circumferential direction DRc, is defined as an outflow port pitch. The outflow port pitch is the interval between the portion of the first intermediate port 91, which is located on the other side of the center (centered in the circumferential direction DRc) of the first intermediate port 91 in the other direction, and the portion of the second intermediate port 92, which is opposed to the portion of the first intermediate port 91 and is located on the one side of the center (centered in the circumferential direction DRc) of the second intermediate port 92 in the one direction.

In the present embodiment, the first intermediate port 91 and the second intermediate port 92 are respectively shaped in the circle and respectively have the equal size of the opening cross-sectional area, and the center of the first intermediate port 91 and the center of the second intermediate port 92 overlap with each other in the circumferential direction DRc. Therefore, the outflow port pitch of the first intermediate port 91 and the second intermediate port 92 is set such that the interval between the first other-side end 91b and the second one-side end 92a becomes a minimum value of the outflow port pitch. Hereinafter, the minimum value of the outflow port pitch will be also referred to as a minimum pitch P1.

Here, a line, which extends through the center of the first intermediate port 91 and the center of the second intermediate port 92 in the circumferential direction DRc, will be referred to as an imaginary center line VL. The imaginary center line VL extends through an axial location located in the axial direction DRa where the outflow port pitch is the minimum pitch P1.

In the present embodiment, the minimum pitch P1 between the first intermediate port 91 and the second intermediate port 92 is smaller than a distance between two intersecting points of the first opening 61 which intersect with the imaginary center line VL. In other words, the minimum pitch P1 is smaller than the circumferential dimension (i.e., the inner diameter φ3) of the first opening 61 measured in the circumferential direction DRc at the above-described axial location (i.e., the location located in the axial direction DRa) where the outflow port pitch is minimum.

Furthermore, the outflow port pitch between the first intermediate port 91 and the second intermediate port 92 is set such that in the state where the first intermediate port 91 and the second intermediate port 92 are both simultaneously communicated with the first opening 61, when the valve 20 is rotated, a communicating range of each of the first intermediate port 91 and the second intermediate port 92, which is communicated with the first opening 61, is changed. Specifically, the first intermediate port 91 and the second intermediate port 92 are configured such that when the communicating range between the first intermediate port 91 and the first opening 61 is increased in response to the rotation of the valve 20, the communicating range between the second intermediate port 92 and the first opening 61 is decreased. Furthermore, the first intermediate port 91 and the second intermediate port 92 are configured such that when the communicating range between the first intermediate port 91 and the first opening 61 is decreased in response to the rotation of the valve 20, the communicating range between the second intermediate port 92 and the first opening 61 is increased.

In the present embodiment, the first intermediate port 91 and the second intermediate port 92 are spaced from each other such that the distance between the first one-side end 91a and the second other-side end 92b is larger than the inner diameter φ3. Specifically, the minimum pitch P1 is set such that a sum of the minimum pitch P1, the diameter φ5 of the first intermediate port 91 and the diameter φ5 of the second intermediate port 92 is larger than the inner diameter φ3 of the first opening 61.

Furthermore, in the present embodiment, a center pitch P2, which is an interval between the center of the first intermediate port 91 and the center of the second intermediate port 92, is set to be the same value as the inner diameter φ3 of the first opening 61. Specifically, as shown in FIG. 12, the center pitch P2 is the distance from the one-side seat end 61a to the other-side seat end 61b and is equal to the inner diameter φ3 of the first opening 61.

When the first intermediate port 91 and the second intermediate port 92 are configured in the above-described manner, the distance from the first one-side end 91a to the second one-side end 92a becomes equal to the inner diameter φ3 of the first opening 61. Furthermore, the distance from the first other-side end 91b to the second other-side end 92b also becomes equal to the inner diameter φ3 of the first opening 61.

Furthermore, as shown in FIG. 13, when the valve 20 is rotated to a position where the first one-side end 91a overlaps with the one-side seat end 61a, the valve 20 is placed in a state where the whole of the first intermediate port 91 is communicated with the first opening 61, and the whole of the second intermediate port 92 is not communicated with the first opening 61. Then, as shown in FIG. 14, when the valve 20 is rotated to a position where the first other-side end 91b overlaps with the one-side seat end 61a, the valve 20 is placed in a state where the whole of the first intermediate port 91 is not communicated with the first opening 61, and the whole of the second intermediate port 92 is communicated with the first opening 61.

Next, the interval between the third intermediate port 93 and the fourth intermediate port 94 will be described. The interval between the third intermediate port 93 and the fourth intermediate port 94 is set like the interval between the first intermediate port 91 and the second intermediate port 92. Specifically, an interval between the center of the third intermediate port 93 and the center of the fourth intermediate port 94, is set to be the same value as the inner diameter φ3 of the first opening 61.

Figure 15:
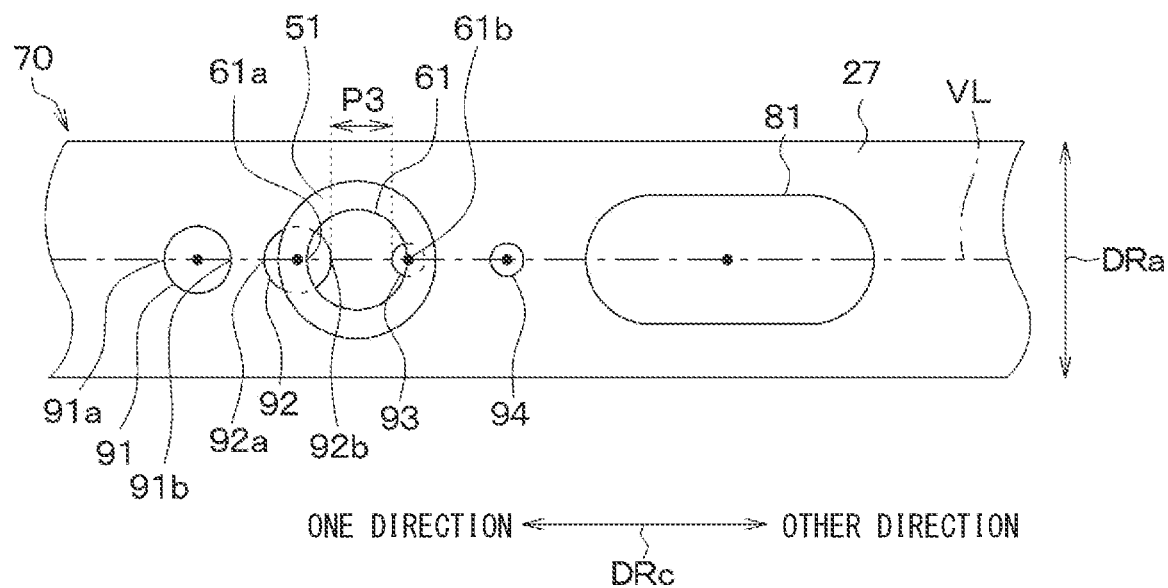
FIG. 15 is an explanatory diagram for explaining an interval between the second intermediate port and a third intermediate port according to the first embodiment.

Next, an interval between the second intermediate port 92 and the third intermediate port 93, which are adjacent to each other, will be described with reference to FIG. 15. Furthermore, an interval between a portion of the second intermediate port 92 and a portion of the third intermediate port 93, which overlap with each other in the circumferential direction DRc, is defined as an intermediate pitch.

In the present embodiment, the second intermediate port 92 and the third intermediate port 93 are respectively shaped in the circle, and the center of the second intermediate port 92 and the center of the third intermediate port 93 overlap with each other in the circumferential direction DRc. Therefore, the intermediate pitch between the second intermediate port 92 and the third intermediate port 93 is a minimum value P3 of the interval between the second other-side end 92b and an one-side end of the third intermediate port 93 located on the one side in the one direction. The second intermediate port 92 and the third intermediate port 93 are configured such that the minimum value P3 of the intermediate pitch is smaller than the inner diameter φ3 of the first opening 61.

Figure 16:
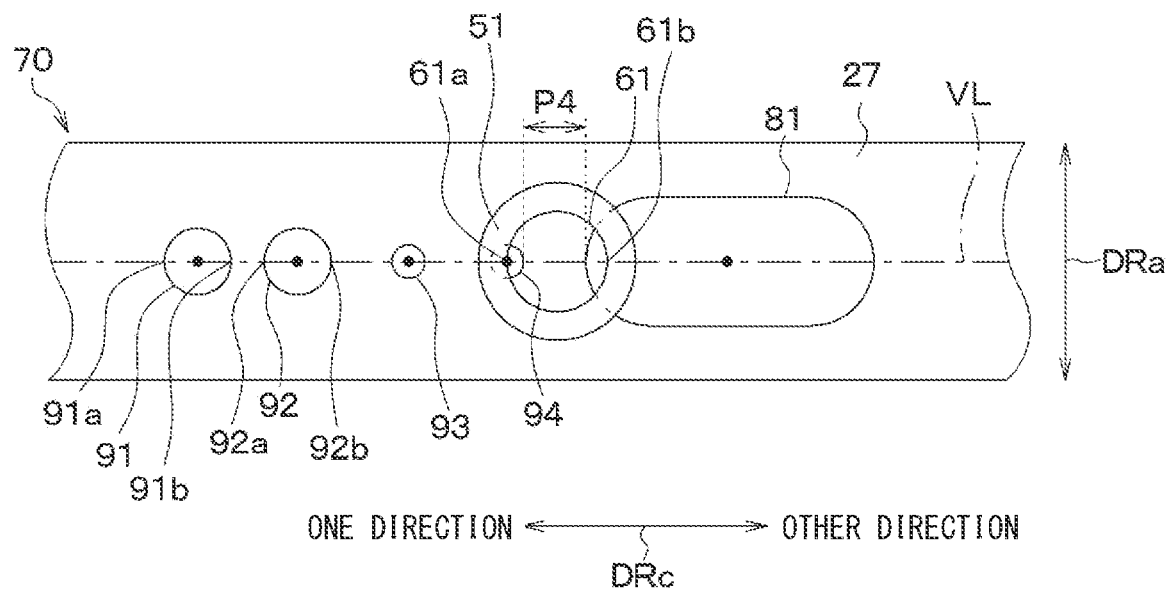
FIG. 16 is an explanatory diagram for explaining an interval between a fourth intermediate port and a main outflow port according to the first embodiment.

Next, an interval between the fourth intermediate port 94 and the main outflow port 81, which are adjacent to each other, will be described with reference to FIG. 16. Here, an interval between a portion of the fourth intermediate port 94 and a portion of the main outflow port 81, which overlap with each other in the circumferential direction DRc, is defined as a main pitch.

In the present embodiment, the fourth intermediate port 94 is shaped in the circle. Furthermore, the main outflow port 81 is an oblong hole that is formed by two straight lines, which extend in the circumferential direction DRc, and two arcs, which are semicircles and are joined with the two straight lines. Furthermore, the center of the fourth intermediate port 94 and the center of the main outflow port 81 overlap with each other in the circumferential direction DRc.

Therefore, the main pitch between the fourth intermediate port 94 and the main outflow port 81 is a minimum value P4 of an interval between an other-side end of the fourth intermediate port 94, which is located on the other side in the other direction, and a one-side end of the main outflow port 81, which is located on the one side in the one direction. The fourth intermediate port 94 and the main outflow port 81 are configured such that the minimum value P4 of the main pitch is smaller than the inner diameter φ3 of the first opening 61.

(Operation of Valve Device 1)

Next, the operation of the valve device 1 will be described. The valve device 1 receives information about the rotational position of the valve 20 from the ECU (not shown) to discharge the coolant at the required flow rate that is required to be supplied to the air conditioning heat exchanger 4, the oil cooler 5 and the radiator 6. The valve device 1 rotates the valve 20 based on the information about the rotational position of the valve 20 received from the ECU. Furthermore, the valve device 1 transmits information about the rotational position of the shaft 25 sensed with the rotational angle sensor 33 to the ECU. The ECU calculates the rotational position of the valve 20 based on the information about the rotational position of the shaft 25 received from the valve device 1 and feeds back it to the valve device 1.

The valve device 1 adjusts the rotational position of the valve 20 based on the information about the rotational position of the valve 20 received from the ECU. The valve device 1 discharges the coolant from each corresponding one of the first to third outlets 41-43 at the flow rate that corresponds to the open ratio of the corresponding one of the first to third openings 61-63 set based on the rotational position of the valve 20.

Next, the open ratio of each of the first to third openings 61-63 in the case of rotating the valve 20 in the one direction within the range of 0° to 240° will be described with reference to FIGS. 17 to 19. A solid line shown in FIG. 17 indicates a relationship between the rotational position of the valve 20 and the open ratio of the first opening 61. Also, a dot-dash line indicates a relationship between the rotational position of the valve 20 and the open ratio of the second opening 62. Furthermore, a dot-dot-dash line indicates a relationship between the rotational position of the valve 20 and the open ratio of the third opening 63.

Figure 17:
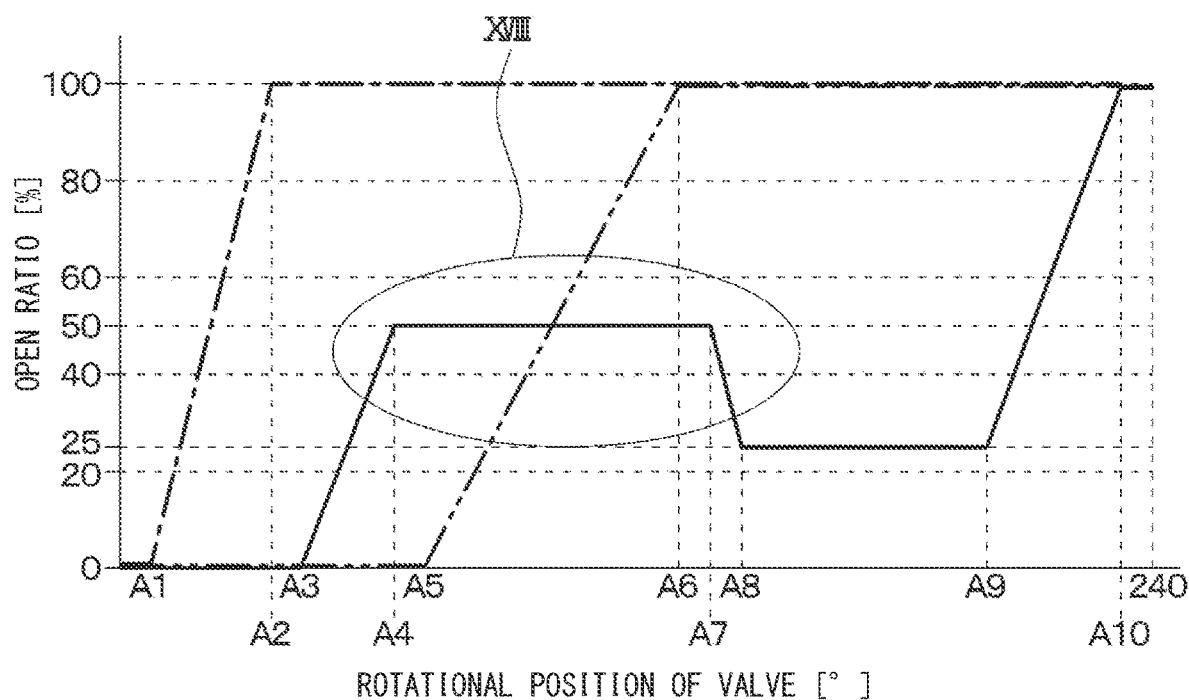
FIG. 17 is a graph showing a relationship between a rotational position of the valve and open ratios of first to third openings according to the first embodiment.

Although not indicated in FIG. 17, the valve 20 is configured such that in a case where the open ratio of any one of the first to third openings 61-63 is larger than 0%, the open ratio of the fourth opening 64 becomes 100%.

Figure 18:
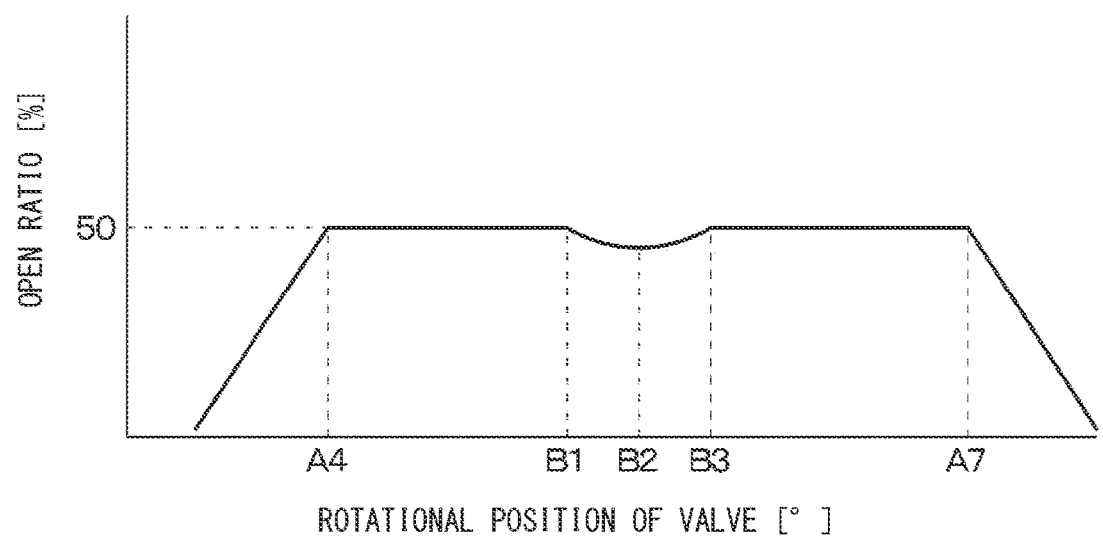
FIG. 18 is an enlarged view of a portion XVIII in FIG. 17.
Figure 19:
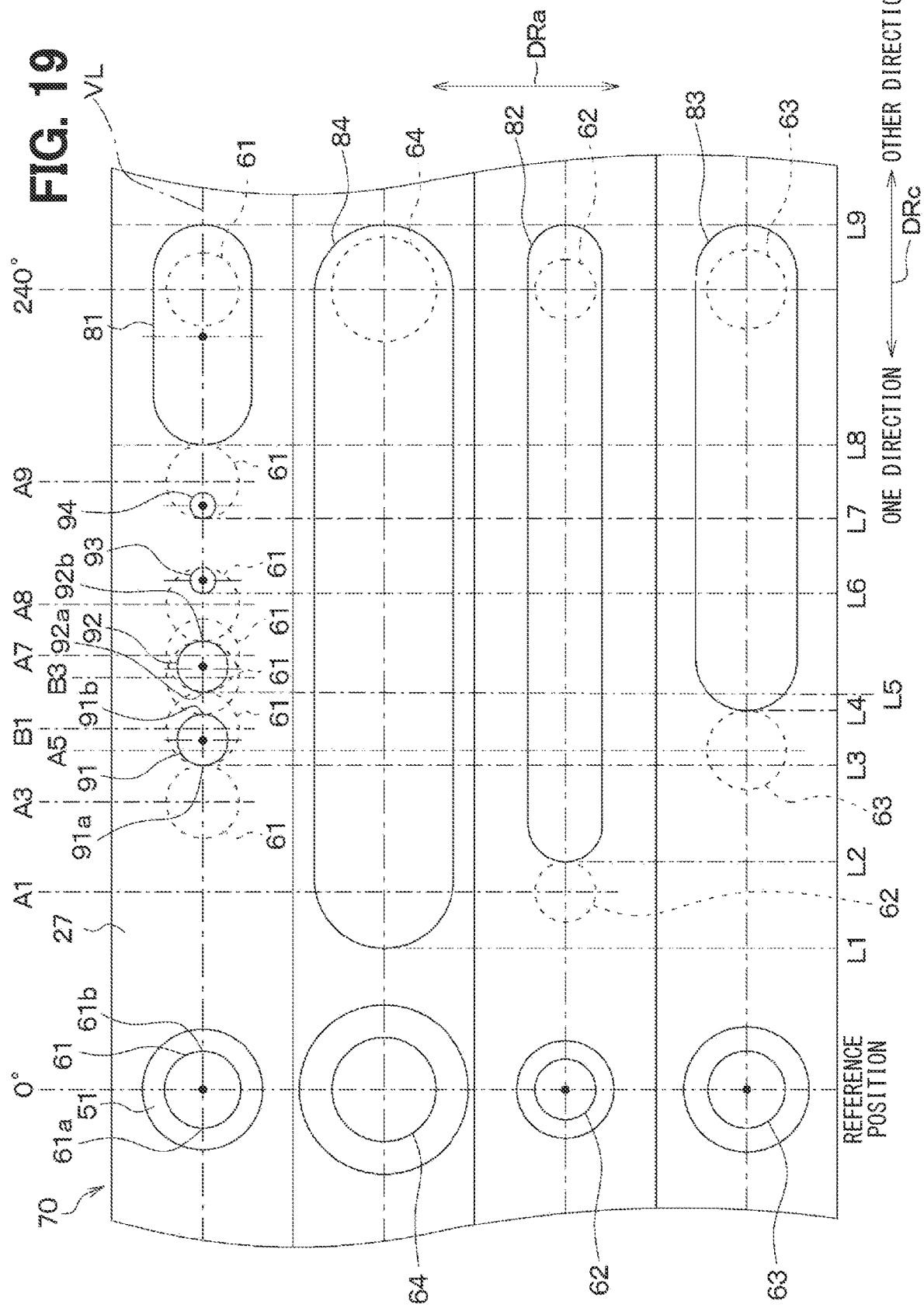
FIG. 19 is an explanatory diagram for explaining a positional relationship among the main outflow port, the first to fourth intermediate ports, the second outflow port and the third outflow port according to the first embodiment.

Furthermore, in FIG. 19, in order to explain the rotational position of the valve 20, locations of the first to fourth openings 61-64 at the time of rotating the valve 20 to a position A, a position B and 240° are indicated by dotted lines. The position A and the position B in FIG. 19 indicate the rotational positions of the valve 20 shown in FIGS. 17 and 18.

As shown in FIG. 17, in the valve device 1, the open ratio of each of the first to third openings 61-63 can be adjusted by adjusting the rotational position of the valve 20. For example, in the valve device 1, when the rotational position of the valve 20 is 0°, the open ratio of each of the first to third openings 61-63 becomes 0%. Specifically, the valve device 1 is placed in the valve closing state when the rotational position of the valve 20 is 0°. Furthermore, in the valve device 1, when the rotational position of the valve 20 is 240°, each of the first to third openings 61-63 is fully opened (i.e., the open ratio becomes 100%).

Details of the open ratio of the second opening 62 will now be described. In the valve device 1, the second opening 62 begins to open when the rotational position of the valve 20 becomes larger than a position A1, at which the one-side end of the second outflow port 82, which is located on the one side in the one direction, and the other-side end of the second opening 62, which is located on the other side in the other direction, overlap with each other in the radial direction DRr. Specifically, in the valve device 1, the open ratio of the second opening 62 becomes larger than 0% when the rotational position of the valve 20 becomes larger than the position A1.

Furthermore, in the valve device 1, the second opening 62 is fully opened (i.e., the open ratio becomes 100%) when the rotational position of the valve 20 is a position A2, at which the one-side end of the second outflow port 82, which is located on the one side in the one direction, and the one-side end of the second opening 62, which is located on the one side in the one direction, overlap with each other in the radial direction DRr. In the valve device 1, the open ratio of the second opening 62 is maintained at 100% when the valve 20 is rotated within the range of the position A2 to 240°.

Details of the open ratio of the third opening 63 will now be described. In the valve device 1, the third opening 63 begins to open when the rotational position of the valve 20 becomes larger than a position A5, at which the one-side end of the third outflow port 83, which is located on the one side in the one direction, and the other-side end of the third opening 63, which is located on the other side in the other direction, overlap with each other in the radial direction DRr. Specifically, in the valve device 1, the open ratio of the third opening 63 becomes larger than 0% when the rotational position of the valve 20 becomes larger than the position A5.

Furthermore, in the valve device 1, the third opening 63 is fully opened (i.e., the open ratio becomes 100%) when the rotational position of the valve 20 is a position A6, at which the one-side end of the third outflow port 83, which is located on the one side in the one direction, and the one-side end of the third opening 63, which is located on the one side in the one direction, overlap with each other in the radial direction DRr. In the valve device 1, the open ratio of the third opening 63 is maintained at 100% when the valve 20 is rotated within the range of the position A6 to 240°.

Details of the open ratio of the first opening 61 will now be described. In the valve device 1, the first opening 61 begins to open when the rotational position of the valve 20 becomes larger than a position A3, at which the first one-side end 91a and the other-side seat end 61b overlap with each other in the radial direction DRr. Specifically, in the valve device 1, the open ratio of the first opening 61 becomes larger than 0% when the rotational position of the valve 20 becomes larger than the position A3.

In the valve device 1, the first opening 61 is communicated with the whole of the first intermediate port 91 when the rotational position of the valve 20 becomes a position A4, at which the first other-side end 91b and the other-side seat end 61b overlap with each other in the radial direction DRr. In the valve device 1, the open ratio of the first opening 61 becomes 50% when the rotational position of the valve 20 becomes the position A4.

As shown in FIG. 18, the valve device 1 maintains the open ratio of the first opening 61 at 50% when the valve 20 is rotated from the position A4 to a position B1, at which the first one-side end 91a and the one-side seat end 61a overlap with each other in the radial direction DRr. The second one-side end 92a of the second intermediate port 92 overlaps with the other-side seat end 61b in the radial direction DRr when the rotational position of the valve 20 becomes the position B1.

Furthermore, in the valve device 1, when the rotational position of the valve 20 becomes a position B3, at which the first other-side end 91b and the one-side seat end 61a overlap with each other in the radial direction DRr, the first intermediate port 91 is placed in the non-communicating state, in which the whole of the first intermediate port 91 is not communicated with the first opening 61. In contrast, in the valve device 1, when the rotational position of the valve 20 becomes the position B3, the second other-side end 92b and the other-side seat end 61b overlap with each other in the radial direction DRr, and the first opening 61 is communicated with the whole of the second intermediate port 92. Therefore, in the valve device 1, the open ratio of the first opening 61 becomes 50% when the rotational position of the valve 20 becomes the position B3.

As shown in FIG. 18, the valve device 1 maintains the open ratio of the first opening 61 at 50% when the valve 20 is rotated from the position B3 to a position A7, at which the second one-side end 92a and the one-side seat end 61a overlap with each other in the radial direction DRr.

When the valve 20 is rotated from the position B1 to the position B3, the state of the first intermediate port 91 changes from the state, in which the whole of the first intermediate port 91 is communicated with the first opening 61, to the state, in which a portion of the first intermediate port 91 is communicated with the first opening 61, and then to the state, in which the whole of the first intermediate port 91 is not communicated with the first opening 61. Thus, the communicating range of the first intermediate port 91 relative to the first opening 61 is decreased when the rotational position of the valve 20 changes from the position B1 toward the position B3.

In contrast, when the valve 20 is rotated from the position B1 to the position B3, the state of the second intermediate port 92 changes from the state, in which the whole of the second intermediate port 92 is not communicated with the first opening 61, to the state, in which a portion of the second intermediate port 92 is communicated with the first opening 61, and then to the state, in which the whole of the second intermediate port 92 is communicated with the first opening 61. Thus, the communicating range of the second intermediate port 92 relative to the first opening 61 is increased when the rotational position of the valve 20 changes from the position B1 toward the position B3.

Furthermore, when the valve 20 is rotated from the position B1 to the position B2, the amount of decrease in the communicating range between the first intermediate port 91 and the first opening 61 is larger than the amount of increase in the communicating range between the second intermediate port 92 and the first opening 61. Therefore, as shown in FIG. 18, the open ratio of the first opening 61 is progressively decreased when the rotational position of the valve 20 is changed from the position B1 toward the position B2 which is an intermediate position between the position B1 and the position B3. The position B2 is a position, at which the center of the first intermediate port 91 overlaps with the one-side seat end 61a, and the center of the second intermediate port 92 overlaps with the other-side seat end 61b.

Furthermore, when the valve 20 is rotated from the position B2 to the position B3, the amount of decrease in the communicating range between the first intermediate port 91 and the first opening 61 is smaller than the amount of increase in the communicating range between the second intermediate port 92 and the first opening 61. Thus, the open ratio of the first opening 61 is progressively increased when the rotational position of the valve 20 changes from the position B2 toward the position B3.

As described above, the open ratio of the first opening 61 in the range, in which the rotational position of the valve 20 changes from the position B1 to the position B3, becomes smaller than 50%. In the present embodiment, when the outflow port, which is communicated with the first opening 61, is changed from the first intermediate port 91 to the second intermediate port 92, the amount of decrease in the open ratio of the first opening 61 is less than 5% of the opening cross-sectional area of the first opening 61.

Therefore, the valve device 1 can maintain the open ratio of the first opening 61 at about 50% in the range of the position B1 to the position B3. Thus, at the time of rotating the valve 20 from the position A4 to the position A7, the valve device 1 can adjust the open ratio of the third opening 63 from 0% to 100% in the state where the open ratio of the first opening 61 is maintained at about 50%, and the open ratio of the second opening 62 is maintained at 100%.

Specifically, the valve device 1 can adjust the flow rate of the coolant discharged from the third opening 63 in the state where the open ratio of the first opening 61 is maintained at about 50% by sufficiently ensuring the rotational range of the valve 20, in which the open ratio of the first opening 61 becomes about 50%.

Now, with reference to FIGS. 20 and 21, there will be described a comparative example, in which the first intermediate port 91 is configured differently from that of the present embodiment. In the comparative example, in place of the first intermediate port 91, an oblong outflow port 95 is formed at the valve outer peripheral portion 70.

Figure 20:
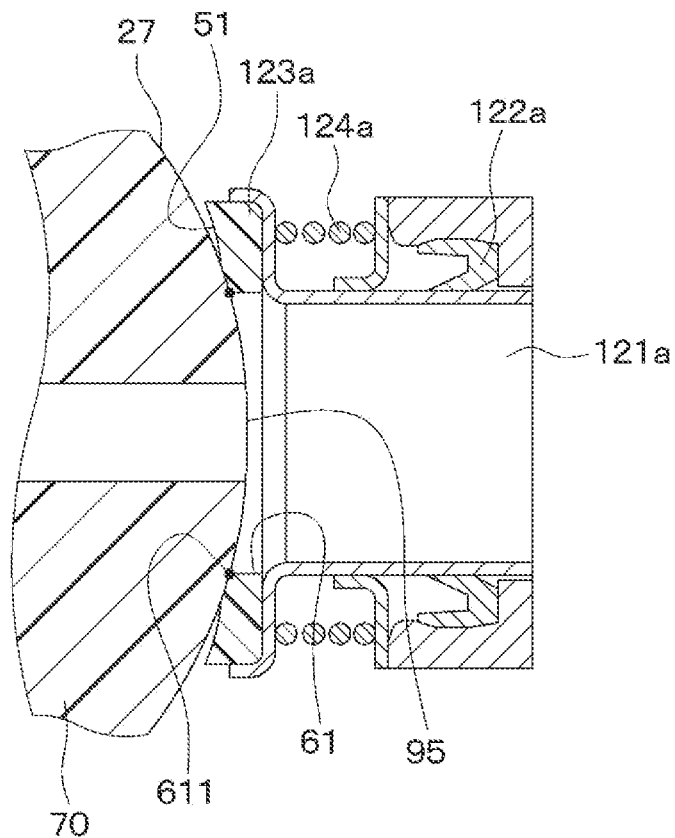
FIG. 20 is a cross-sectional view showing a state in which an intermediate port and a first opening of a comparative example are communicated with each other.
Figure 21:
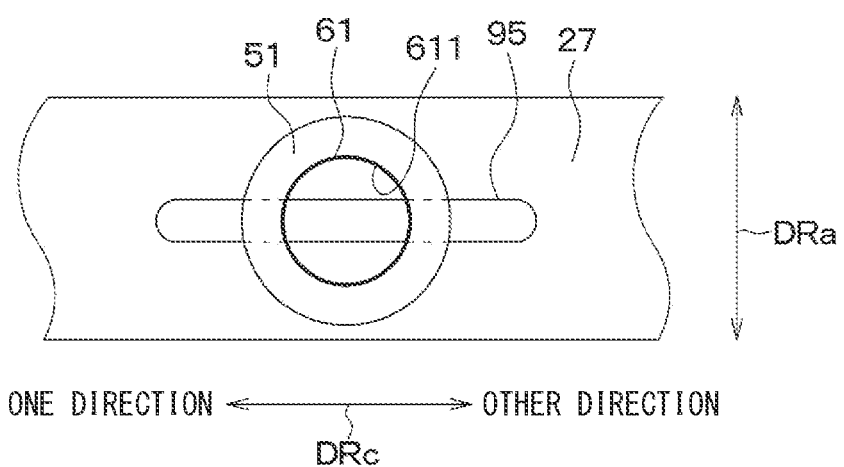
FIG. 21 is a diagram for explaining a sliding portion between a first seat surface and a closing surface at the time of communicating between the intermediate port and the first opening in the comparative example.

As shown in FIGS. 20 and 21, the oblong outflow port 95 is formed as an oblong hole such that an axial dimension of the oblong outflow port 95 measured in the axial direction DRa is smaller than the inner diameter φ3 of the first opening 61, and a circumferential dimension of the oblong outflow port 95 measured in the circumferential direction DRc is larger than the inner diameter φ3 of the first opening 61. Furthermore, an edge of the oblong outflow port 95 has a pair of straight lines which extend in the circumferential direction DRc. Also, the oblong outflow port 95 overlaps with the first opening 61 in the circumferential direction DRc. A maximum communicating range of the oblong outflow port 95, which can be communicated with the first opening 61, is 50% of the size of the first opening 61.

With the above configuration, the rotational range of the valve 20, in which the first opening 61 and the oblong outflow port 95 are communicated with each other, can be easily increased. Therefore, it is easy to ensure the rotational range of the valve 20, in which the open ratio of the first opening 61 is 50%.

When the valve 20 is rotated to the position, at which the open ratio of the first opening 61 is 50%, a portion of the opening edge 611 of the first opening 61 is opposed to the closing surface 27, and another portion of the opening edge 611 of the first opening 61 is not opposed to the closing surface 27. Specifically, the non-overlapping portion of the opening edge 611, which does not overlap with the oblong outflow port 95 in the radial direction DRr, is opposed to the closing surface 27. In contrast, the overlapping portion of the opening edge 611, which overlaps with the oblong outflow port 95 in the radial direction DRr, is opposed to the oblong outflow port 95 and is not opposed to the closing surface 27.

Therefore, when the valve 20 is rotated in the range, in which the open ratio of the first opening 61 becomes 50%, only the non-overlapping portion of the opening edge 611, which does not overlap with the oblong outflow port 95 in the circumferential direction DRc, is slid along the closing surface 27.

Thus, in the rotational range of the valve 20, the sliding range of the non-overlapping portion of the opening edge 611 (i.e., the portion not overlapped with the oblong outflow port 95 in the circumferential direction DRc), which slides along the closing surface 27, becomes larger than the sliding range of the overlapping portion of the opening edge 611 (i.e., the portion overlapped with the oblong outflow port 95 in the circumferential direction DRc), which slides along the closing surface 27. Furthermore, when the valve 20 is rotated in the state where the opening edge 611 is overlapped with the straight linear portion of the oblong outflow port 95, there is maintained the state where the whole of the non-overlapping portion of the opening edge 611 (i.e., the portion not overlapped with the oblong outflow port 95 in the circumferential direction DRc) slides along the closing surface 27.

Therefore, when the oblong outflow port 95 of the comparative example is applied, the opening edge 611 is likely to have a difference in the amount of wear between the overlapping portion of the opening edge 611 (i.e., the portion overlapped with the oblong outflow port 95 in the circumferential direction DRc) and the non-overlapping portion of the opening edge 611 (i.e., the portion not overlapped with the oblong outflow port 95 in the circumferential direction DRc). This will cause uneven localized wearing of the non-overlapping portion of the opening edge 611 (i.e., the portion not overlapped with the oblong outflow port 95 in the circumferential direction DRc) in comparison to the overlapping portion of the opening edge 611 (i.e., the portion overlapped with the oblong outflow port 95 in the circumferential direction DRc). When the portion of the opening edge 611 has the uneven localized wearing, it is difficult to ensure the required degree of sealing of the first valve seat 123a, and it will cause leakage of the coolant from a gap between the portion of the opening edge 611, which has the uneven localized wearing, and the closing surface 27 at the time of placing the valve 20 in the valve closing state.

In contrast, each of the first to fourth intermediate ports 91-94 of the present embodiment is configured such that the axial dimension of the port 91-94 measured in the axial direction DRa is progressively decreased in the circumferential direction DRc from the location of the port 91-94, at which the axial dimension measured in the axial direction DRa is maximum, to the other location of the port 91-94, at which the axial dimension measured in the axial direction DRa is minimum. Furthermore, there is no straight linear portion, which extends in the circumferential direction DRc, in the first to fourth intermediate ports 91-94.

Therefore, when the valve 20 is rotated in the range, in which the corresponding one of the first to fourth intermediate ports 91-94 overlaps with the opening edge 611 in the radial direction DRr, the range of the non-sliding portion of the opening edge 611 is progressively changed along a contour of the port 91-94.

For example, in the case where the valve 20 is rotated to change the first intermediate port 91 from the non-communicating state, in which the first intermediate port 91 is not communicated with the first opening 61, to the communicating state, in which the whole of the first intermediate port 91 is communicated with the first opening 61, the range of the non-sliding portion of the opening edge 611, which does not slide along the closing surface 27, is progressively increased and is then progressively decreased after reaching a predetermined range in response to the rotation of valve 20.

Specifically, in a state, in which a portion of the first intermediate port 91 is communicated with the first opening 61, a portion of the opening edge 611, which overlaps with the first intermediate port 91 in the radial direction DRr, is not opposed to the closing surface 27. When the communicating range between the first opening 61 and the first intermediate port 91 is increased in response to the rotation of the valve 20 in the one direction, the overlapping range of the opening edge 611, which overlaps with the first intermediate port 91 in the radial direction DRr, is increased. Therefore, the range of the non-opposing portion of the opening edge 611, which is not opposed to the closing surface 27, is increased.

When the valve 20 is further rotated in the one direction to a position, in which the opening edge 611 overlaps with the location of the first intermediate port 91, at which the axial dimension measured in the axial direction DRa is maximum, in the radial direction DRr, the range of the non-opposing portion of the opening edge 611, which is not opposed to the closing surface 27, becomes maximum.

Figure 22:
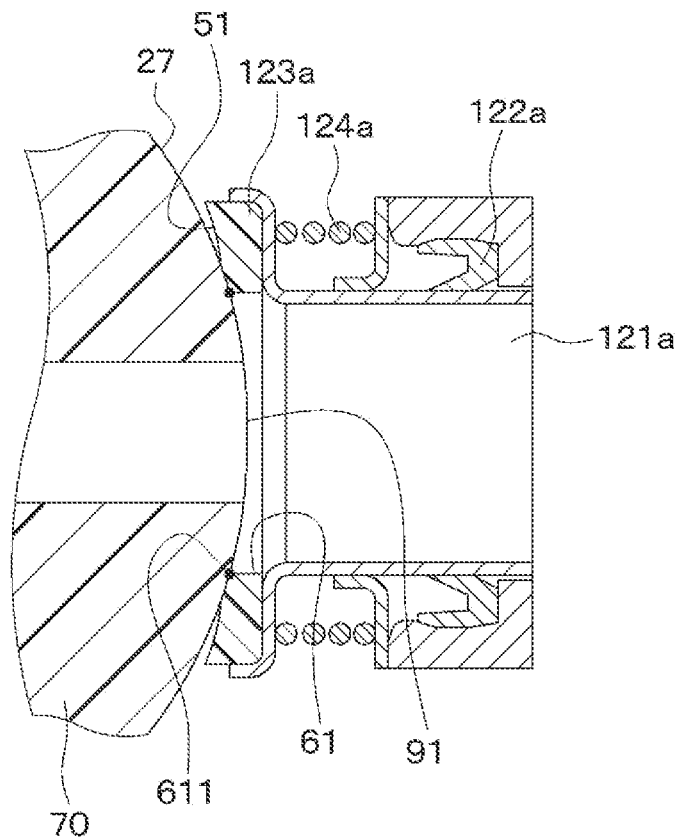
FIG. 22 is a cross-sectional view showing a state in which the first opening and the first intermediate port are communicated with each other according to the first embodiment.
Figure 23:
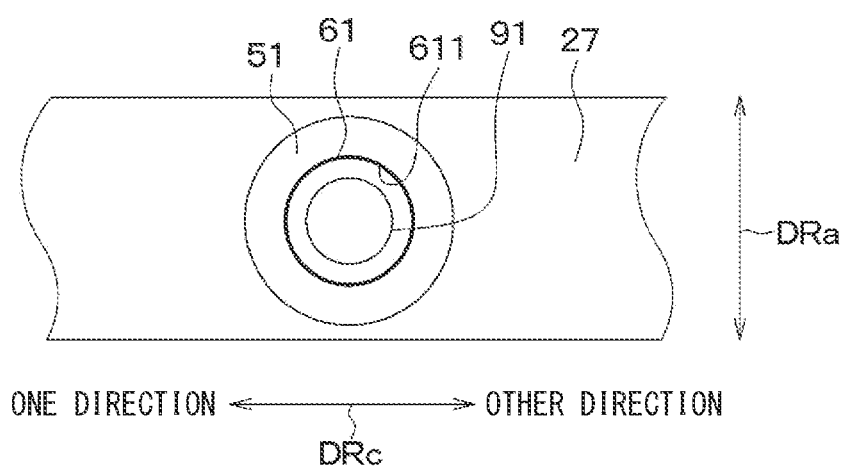
FIG. 23 is a diagram for explaining the sliding portion between the first seat surface and the closing surface at the time of communicating between the first opening and the first intermediate port according to the first embodiment.

When the valve 20 is further rotated in the one direction from the position, at which the non-opposing portion of the opening edge 611 (i.e., the portion not opposed to the closing surface 27) is maximum, the overlapping range of the opening edge 611, which overlaps with the first intermediate port 91 in the radial direction DRr, is decreased. Therefore, the range of the non-opposing portion of the opening edge 611, which is not opposed to the closing surface 27, is decreased. Then, as shown in FIGS. 22 and 23, when the valve 20 is rotated to the position, in which the whole of the first intermediate port 91 is communicated with the first opening 61, the opening edge 611 no longer has the non-opposing portion, which is not opposed to the closing surface 27. Specifically, the opening edge 611 is opposed to the closing surface 27 along the entire perimeter of the opening edge 611.

As described above, in the present embodiment, in the case where the first intermediate port 91 overlaps with the opening edge 611 in the radial direction DRr, the non-opposing portion of the opening edge 611, which is not opposed to the closing surface 27, changes depending on the rotational position of the valve 20. Therefore, when the valve 20 is rotated in the range, in which the first intermediate port 91 overlaps with the opening edge 611 in the radial direction DRr, the range of the non-sliding portion of the opening edge 611 (i.e., the portion that does not slide along the closing surface 27) is progressively changed along the contour of the port 91-94 in response to the rotation of the valve 20.

Next, the open ratio of the first opening 61 at the time of rotating the valve 20 in the one direction from the position A7 will be described. In the valve device 1, when the rotational position of the valve 20 becomes a position A8, at which the other-side end of the third intermediate port 93, which is located on the other side in the other direction, overlaps with the other-side seat end 61b in the radial direction DRr, the first opening 61 is placed in the non-communicating state, in which the first opening 61 is not communicated with the whole of the second intermediate port 92. In contrast, in the valve device 1, when the rotational position of the valve 20 becomes the position A8, the first opening 61 is communicated with the whole of the third intermediate port 93. In the valve device 1, the open ratio of the first opening 61 becomes 25% when the rotational position of the valve 20 becomes the position A8.

Furthermore, the valve device 1 maintains the open ratio of the first opening 61 at about 25% when the valve 20 is rotated from the position A8 to a position A9, at which the one-side end of the fourth intermediate port 94, which is located on the one side in the one direction, overlaps with the one-side seat end 61a in the radial direction DRr. The one-side end of the main outflow port 81, which is located on the one side in the one direction, overlaps with the other-side seat end 61b in the radial direction DRr when the rotational position of the valve 20 becomes the position A9.

In the valve device 1, the first opening 61 begins to communicate with the main outflow port 81, and the open ratio of the first opening 61 becomes larger than 25% when the rotational position of the valve 20 becomes larger than the position A9. Furthermore, in the valve device 1, the first opening 61 is fully opened (i.e., the open ratio becomes 100%) when the rotational position of the valve 20 is a position A10, at which the one-side end of the main outflow port 81, which is located on the one side in the one direction, overlaps with the one-side seat end 61a in the radial direction DRr. In the valve device 1, the open ratio of the first opening 61 is maintained at 100% when the valve 20 is rotated within the range of the position A10 to 240°.

In the valve device 1 described above, when the main outflow port 81 and the first opening 61 are communicated with each other, the coolant flows through the whole of the first opening 61. Furthermore, in the valve device 1, when one of the first to fourth intermediate ports 91-94 is communicated with the first opening 61, the coolant flows through a portion of the first opening 61. In this case, in the valve device 1, the flow rate of the coolant, which is discharged from the first outlet 41, is reduced in comparison to the case where the main outflow port 81 and the first opening 61 are communicated with each other.

Therefore, in the valve device 1, the flow rate of the coolant, which is discharged from the first outlet 41 in the valve opening state, can be adjusted by changing the outflow port, which is communicated with the first opening 61, from the main outflow port 81 to one of the first to fourth intermediate ports 91-94 by rotating the valve 20.

Furthermore, since the four intermediate ports are formed at the valve outer peripheral portion 70, the rotational range of the valve 20, in which the first opening 61 and the intermediate port(s) are communicated with each other, can be increased in comparison to a case where only one intermediate port is formed at the valve outer peripheral portion 70.

The valve device 1 has the first intermediate port 91 and the second intermediate port 92, each of which has the opening cross-sectional area that is 50% of the opening cross-sectional area of the first opening 61. Thus, in the valve device 1, the third opening 63 can be more easily opened and closed in the state where the open ratio of the first opening 61 is maintained at 50% in comparison to the case where only one of the first intermediate port 91 and the second intermediate port 92 is provided.

Furthermore, the first to fourth intermediate ports 91-94 are respectively shaped in the circle and have the axial dimension, which is measured in the axial direction DRa and is progressively changed in the circumferential direction DRc. Thus, when the valve 20 is rotated in the range, in which the corresponding one of the first to fourth intermediate ports 91-94 overlaps with the opening edge 611 in the radial direction DRr, the range of the non-sliding portion of the opening edge 611 (i.e., the portion that does not slide along the closing surface 27) is progressively changed along the contour of the port 91-94 in response to the rotation of the valve 20. Therefore, when the valve 20 is rotated at the position where the one of the first to fourth intermediate ports 91-94 is communicated with the first opening 61, it is possible to limit generation of a difference in the amount of wear between the overlapping portion of the opening edge 611, which overlaps with the intermediate port 91-94, and the non-overlapping portion of the opening edge 611, which does not overlap with the intermediate port 91-94. Thus, the required degree of sealing of the first valve seat 123a can be ensured.

Among the first to fourth intermediate ports 91-94, each adjacent two intermediate ports, which are adjacent to each other, are configured such that a minimum value of an interval between a portion of one of the adjacent two intermediate ports and a portion of the other one of the adjacent intermediate ports, which overlap with each other in the circumferential direction DRc, is smaller than the inner diameter φ3 of the first opening 61. Therefore, the adjacent two intermediate ports can be partially communicated with the first opening 61 at once. Thus, at the time of changing the intermediate port, which is communicated with the first opening 61, to the adjacent two intermediate ports, it is possible to limit the open ratio of the first opening 61 from becoming 0%, and thereby it is possible to limit a change in the flow rate of the coolant discharged from the first outlet 41.

Furthermore, the first intermediate port 91 and the second intermediate port 92 are spaced from each other such that the distance between the first one-side end 91a and the second other-side end 92b is larger than the inner diameter φ3 of the first opening 61. Therefore, in the state where the first intermediate port 91 and the second intermediate port 92 are simultaneously communicated with the first opening 61, when the valve 20 is rotated in the one direction, the communicating range between the second intermediate port 92 and the first opening 61 is increased, and the communicating range between the first intermediate port 91 and the first opening 61 is decreased. Furthermore, in the state where the first intermediate port 91 and the second intermediate port 92 are simultaneously communicated with the first opening 61, when the valve 20 is rotated in the other direction, the communicating range between the second intermediate port 92 and the first opening 61 is decreased, and the communicating range between the first intermediate port 91 and the first opening 61 is increased.

Therefore, at the time of changing the intermediate port, which is communicated with the first opening 61, from the first intermediate port 91 to the second intermediate port 92, it is possible to avoid the simultaneous communication of the whole of the first intermediate port 91 and the whole of the second intermediate port 92 to the first opening 61. As a result, it is possible to limit a change in the flow rate of the coolant, which is discharged from the first outlet 41, in the middle of changing the intermediate port, which is communicated with the first opening 61, from the first intermediate port 91 to the second intermediate port 92.

Furthermore, the center of each of the first to fourth intermediate ports 91-94 overlaps with the center of the first opening 61 in the circumferential direction DRc. Also, the first intermediate port 91 and the second intermediate port 92, which respectively have the equal size of the opening cross-sectional area, are configured such that the interval between the center of the first intermediate port 91 and the center of the second intermediate port 92 is set to be the same value as the inner diameter φ3 of the first opening 61. Furthermore, the third intermediate port 93 and the fourth intermediate port 94, which have the equal size of the opening cross-sectional area, are configured such that the interval between the center of the third intermediate port 93 and the center of the fourth intermediate port 94 is set to be the same value as the inner diameter φ3 of the first opening 61.

With the above settings, the two intermediate ports, which have the equal size of the opening cross-sectional area, have the following result. That is, in the state where a whole of one of the two intermediate ports is communicated with the first opening 61, and a whole of the other one of the two intermediate ports is not communicated with the first opening 61, when the valve 20 is rotated, the one of the two intermediate ports begins to be out of communication with the first opening 61, and the other one of the two intermediate ports begins to communicate with the first opening 61. Furthermore, when the whole of the one of the two intermediate ports is not communicated with the first opening 61 by rotating the valve 20, the whole of the other one of the two intermediate ports is communicated with the first opening 61.

Therefore, in the valve device 1, at the time of changing the intermediate port, which is communicated with the first opening 61, between the two intermediate ports, which respectively have the equal size of the opening cross-sectional area, when the whole of the one of the two intermediate ports is communicated with the first opening 61, it is possible to limit the communication of the other one of the two intermediate ports to the first opening 61. Thus, in the valve device 1, it is possible to limit the open ratio of the first opening 61 from exceeding the open ratio of the first opening 61, which is achieved at the time of communicating the whole of the one of the two intermediate ports to the first opening 61, and thereby it is possible to limit a change in the flow rate of the coolant, which is discharged from the first outlet 41. Furthermore, in the valve device 1, in the case of changing the intermediate port, which is communicated with the first opening 61, between the two intermediate ports, which respectively have the equal size of the opening cross-sectional area, the flow rate of the coolant, which is discharged from the first outlet 41 before the time of changing the intermediate port, and the flow rate of the coolant, which is discharged from the first outlet 41 after the time of changing the intermediate port, can be equal to each other.

Modifications of First Embodiment

In the first embodiment described above, there is described the example where the first to fourth intermediate ports 91-94 are shaped in the circle. However, the present disclosure is not limited to this. For example, as long as each of the first to fourth intermediate ports 91-94 has a shape that can limit the generation of the difference in the amount of wear at the first seat surface 51, the shape of the first to fourth intermediate ports 91-94 may be different from the circle. Specifically, each of the first to fourth intermediate ports 91-94 may be shaped in, for example, an ellipse or rectangle, as long as the axial dimension of the intermediate port 91-94 measured in the axial direction DRa is smaller than the axial dimension of the first opening 61 measured in the axial direction DRa, and the axial dimension of the intermediate port 91-94 measured in the axial direction DRa is progressively changed in the circumferential direction DRc.

Figure 24:
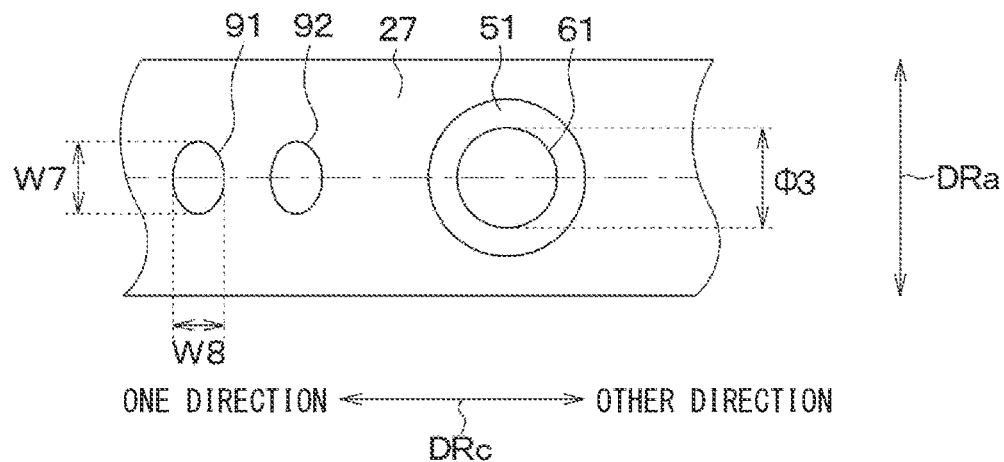
FIG. 24 is a diagram showing a first intermediate port and a second intermediate port according to a modification of the first embodiment.
Figure 25:
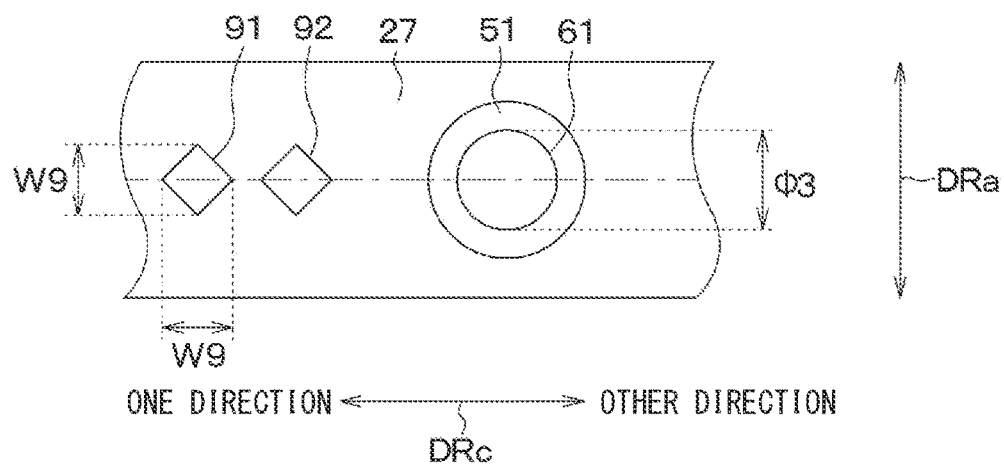
FIG. 25 is a diagram showing a first intermediate port and a second intermediate port according to another modification of the first embodiment.

For example, in the case where the first intermediate port 91 is shaped in the ellipse, as shown in FIG. 24, an axial dimension W7 of the first intermediate port 91 measured in the axial direction DRa may be larger than a circumferential dimension W8 of the first intermediate port 91 measured in the circumferential direction DRc and may be smaller than the inner diameter φ3 of the first opening 61. Furthermore, in the case where the first intermediate port 91 is shaped in the ellipse, although not shown, the circumferential dimension of the first intermediate port 91 measured in the circumferential direction DRc may be larger than the inner diameter φ3 of the first opening 61. Furthermore, in the case where the first intermediate port 91 is shaped in the rectangle, as shown in FIG. 25, an axial dimension W9 of the first intermediate port 91 measured in the axial direction DRa may be equal to a circumferential dimension W9 of the first intermediate port 91 measured in the circumferential direction DRc and may be smaller than the inner diameter φ3 of the first opening 61.

Second Embodiment

Next, a second embodiment will be described with reference to FIGS. 26 and 27. In the present embodiment, the shape of the one-side end of each of the first intermediate port 91 and the second intermediate port 92 located on the one side in the one direction is different from that of the first embodiment. In the present embodiment, different portions, which are different from those of the first embodiment, will be mainly described, and the same portions, which are the same as those of the first embodiment, will not be described for the sake of simplicity.

Figure 26:
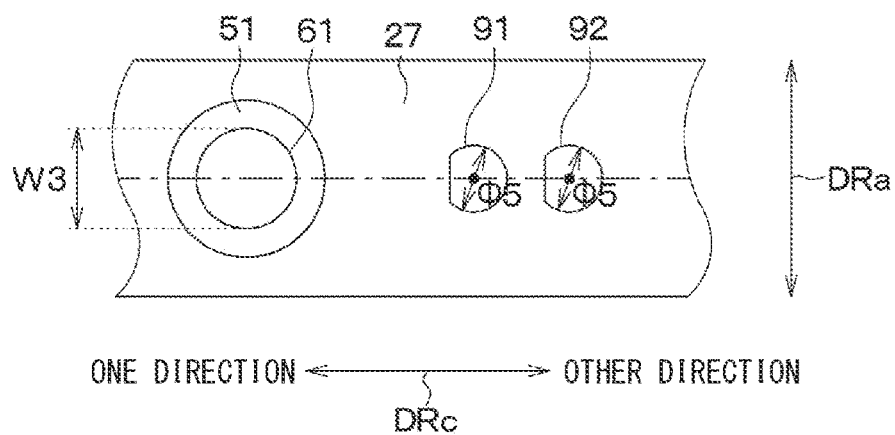
FIG. 26 is a diagram showing a first intermediate port and a second intermediate port according to a second embodiment.
Figure 27:
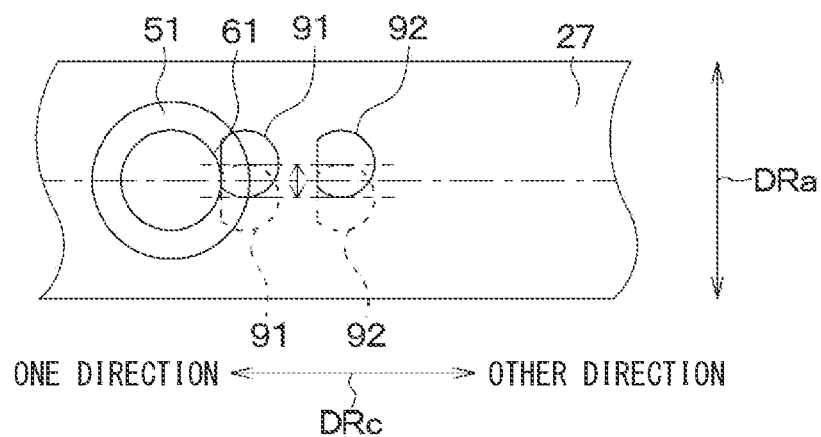
FIG. 27 is a diagram showing a positional deviation between the first intermediate port and the second intermediate port relative to the first opening according to the second embodiment.

As shown in FIG. 26, in the unfolded view of the valve outer peripheral portion 70, each of the first intermediate port 91 and the second intermediate port 92 is shaped to have an arc, which is a part of a circle having a diameter φ5, and a straight line, which extends in the axial direction DRa perpendicular to the circumferential direction DRc and the radial direction DRr and is joined to two circumferential ends of the arc. In the present embodiment, the straight line described above is located at the one-side end of each of the first intermediate port 91 and the second intermediate port 92 located on the one side in the one direction.

Specifically, when the outer peripheral surface of the valve outer peripheral portion 70 is unfolded into the plane, the one-side end of each of the first intermediate port 91 and the second intermediate port 92 located on the one side in the circumferential direction DRc extends in the axial direction DRa. Furthermore, an axial dimension of each of the first intermediate port 91 and the second intermediate port 92 measured in the axial direction DRa is smaller than the axial dimension W3 of the first opening 61 measured in the axial direction DRa and is progressively changed in the circumferential direction DRc.

For instance, the first intermediate port 91, which is configured in this way, begins to communicate with the first opening 61 when the one-side end of the first intermediate port 91 is moved beyond the other-side seat end 61b of the first opening 61 by rotating the valve 20 in the one direction.

Here, even when the center of the first intermediate port 91 is deviated from the center of the first opening 61 in the axial direction DRa, the location of the one-side end of the first intermediate port 91, which is located on the one side in the one direction, does not change at the valve outer peripheral portion 70.

Therefore, the distance between the one-side end of the first intermediate port 91 and the other-side seat end 61b in the circumferential direction DRc does not change when the valve 20 is placed at the predetermined rotational position. Thus, as shown in FIG. 27, at the time of communicating the first intermediate port 91 to the first opening 61 by rotating the valve 20 in the one direction from the predetermined rotational position, the rotational position of the valve 20 at the time of initiating the communication between the first intermediate port 91 and the first opening 61 is likely to be constant.

Furthermore, at the time of placing the first intermediate port 91 into the non-communicating state, in which the first intermediate port 91 is not communicated with the first opening 61, by rotating the valve 20 in the other direction from the communicating state, in which the first intermediate port 91 is communicated with the first opening 61, the rotational position of the valve 20 at the time of placing the first intermediate port 91 into the non-communicating state is likely to be constant.

Therefore, in the present embodiment, even when the center of the first intermediate port 91 or the second intermediate port 92 deviates from the center of the first opening 61 in the axial direction DRa, it is possible to limit an influence of a change in the communicating range of the first intermediate port 91 or the second intermediate port 92 relative to the first opening 61. Thus, the valve device 1 can limit a deterioration in the accuracy of the flow rate of the coolant discharged from the first outlet 41.

First Modification of Second Embodiment

In the second embodiment, there is described the example where in the unfolded view of the valve outer peripheral portion 70, each of the first intermediate port 91 and the second intermediate port 92 is shaped to have the arc, which is the part of the circle having the diameter φ5, and the straight line, which extends in the axial direction DRa and is joined to the two circumferential ends of the arc. However, the present disclosure is not limited to this. For example, each of the first intermediate port 91 and the second intermediate port 92 may have another type of shape that is different from the shape where the arc and the straight line are joined together as long as the rotational position of the valve 20, at which the first intermediate port 91 or the second intermediate port 92 begins to communicate with the first opening 61, is likely to be constant.

Figure 28:
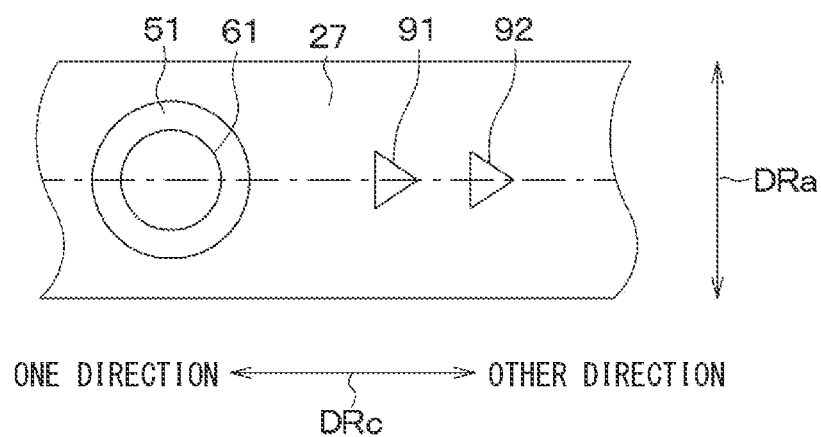
FIG. 28 is a diagram showing a first intermediate port and a second intermediate port according to a modification of the second embodiment.

Specifically, each of the first intermediate port 91 and the second intermediate port 92 may be shaped in a triangle as shown in FIG. 28 where the one-side end of each of the first intermediate port 91 and the second intermediate port 92 located on the one side in the one direction is a straight line that extends in the axial direction DRa. For instance, the first intermediate port 91 may be shaped in the triangle that has: the straight line located at the one-side end of the first intermediate port 91 located on the one side in the one direction; and a pair of straight lines which extend from the other-side end of the first intermediate port 91 located on the other side in the other direction toward the one-side end of the first intermediate port 91 and are joined to the straight line located at the one-side end of the first intermediate port 91.

Second Modification of Second Embodiment

In the second embodiment, there is described the example where in the unfolded view of the valve outer peripheral portion 70, the one-side end of each of the first intermediate port 91 and the second intermediate port 92 extends in the axial direction DRa. However, the present disclosure is not limited to this. Specifically, in the unfolded view of the valve outer peripheral portion 70, each of the first intermediate port 91 and the second intermediate port 92 may be shaped such that in addition to the one-side end of the intermediate port 91, 92, the other-side end of the intermediate port 91, 92 extends in the axial direction DRa. Furthermore, each of the first intermediate port 91 and the second intermediate port 92 may be shaped such that in the unfolded view of the valve outer peripheral portion 70, only the other-side end of the intermediate port 91, 92 extends in the axial direction DRa, and the one-side end of the intermediate port 91, 92 does not extend in the axial direction DRa.

Other Embodiments

Although the representative embodiments of the present disclosure have been described above, the present disclosure is not limited to the above-described embodiments and can be variously modified as follows, for example.

In the above embodiments, there is described the example where the first to fourth intermediate ports 91-94 are respectively formed at the valve outer peripheral portion 70 as the flow outlet that is communicated only with the portion of the first opening 61. However, the present disclosure is not limited to this. For example, only one flow outlet, which is communicated with only the portion of the first opening 61, may be formed at the valve outer peripheral portion 70.

In the above embodiments, there is described the example where the first intermediate port 91 and the second intermediate port 92, which respectively have the equal size of the opening cross-sectional area, and the third intermediate port 93 and the fourth intermediate port 94, which respectively have the equal size of the opening cross-sectional area, are formed at the valve outer peripheral portion 70. However, the present disclosure is not limited to this. For example, three or more flow outlets, each of which has an equal size of an opening cross-sectional area and is communicated with only a portion of the first opening 61, may be formed at the valve outer peripheral portion 70.

In the above embodiments, there is described the example where the valve outer peripheral portion 70 has the intermediate ports, the opening cross-sectional area of which is 50% of the opening cross-sectional area of the first opening 61, and the intermediate ports, the opening cross-sectional area of which is 25% of the opening cross-sectional area of the first opening 61. However, the present disclosure is not limited to this. The opening cross-sectional area of the respective intermediate ports may vary depending on the flow rate of the coolant discharged to various devices connected to the valve device 1. Therefore, it is desirable that the opening cross-sectional area of the respective intermediate ports is set according to the various devices connected to the valve device 1.

In the above embodiments, there is described the example where the first to fourth intermediate ports 91-94 are formed at the location that can be opposed to the first outlet 41. However, the present disclosure is not limited to this. For example, the first to fourth intermediate ports 91-94 may be formed at a location, which can be opposed to the second outlet 42, or a location, which can be opposed to the third outlet 43.

In the above embodiments, there is described the example where the axial dimension of each of the first to fourth intermediate ports 91-94 measured in the axial direction DRa is progressively changed in the circumferential direction DRc. However, the present disclosure is not limited to this. For example, each of the first to fourth intermediate ports 91-94 may be configured such that the intermediate port 91-94 has a portion that extends in the circumferential direction DRc and has the axial dimension, which is measured in the axial direction DRa and does not change in the circumferential direction DRc.

In the above embodiments, there is described the example where the minimum pitch P1 of the outflow port pitch between the first intermediate port 91 and the second intermediate port 92 is smaller than the circumferential dimension of the first opening 61 which is measured in the circumferential direction DRc at the axial location (i.e., the location in the axial direction DRa) where the outflow port pitch is minimum. However, the present disclosure is not limited to this. For example, the minimum pitch P1 of the outflow port pitch between the first intermediate port 91 and the second intermediate port 92 may be larger than the circumferential dimension of the first opening 61 which is measured in the circumferential direction DRc at the axial location (i.e., the location in the axial direction DRa) where the outflow port pitch is minimum.

In the above embodiments, there is described the example where in the state, in which the first intermediate port 91 and the second intermediate port 92 are simultaneously communicated with the first opening 61, when the communicating range of one of the first intermediate port 91 and the second intermediate port 92 communicated with the first opening 61 is increased, the communicating range of the other one of the first intermediate port 91 and the second intermediate port 92 communicated with the first opening 61 is decreased. However, the present disclosure is not limited to this. For example, the first intermediate port 91 and the second intermediate port 92 may be configured such that in the state, in which the first intermediate port 91 and the second intermediate port 92 are simultaneously communicated with the first opening 61, when the communicating range of one of the first intermediate port 91 and the second intermediate port 92 communicated with the first opening 61 is increased, the communicating range of the other one of the first intermediate port 91 and the second intermediate port 92 communicated with the first opening 61 is maintained (unchanged). Specifically, the first intermediate port 91 and the second intermediate port 92 may be spaced from each other by the interval that enables simultaneous communication of the whole of the first intermediate port 91 and the whole of the second intermediate port 92 to the first opening 61.

In the above embodiments, there is described the example where among the first to fourth intermediate ports 91-94, the interval between the centers of the corresponding ones, which have the equal size of the opening cross-sectional area, is equal to the inner diameter φ3 of the first opening 61. However, the present disclosure is not limited to this. For example, among the first to fourth intermediate ports 91-94, the interval between the centers of the corresponding ones, which have the equal size of the opening cross-sectional area, may be different from the inner diameter φ3 of the first opening 61.

In the above embodiments, there is described the example where the centers of the first to fourth intermediate ports 91-94 are placed to overlap with the center of the first opening 61 in the circumferential direction DRc. However, the present disclosure is not limited to this. For example, the first to fourth intermediate ports 91-94 may be placed such that the centers of the first to fourth intermediate ports 91-94 do not overlap with the center of the first opening 61 in the circumferential direction DRc.

Needless to say, in the above-described embodiments, the elements of each embodiment are not necessarily essential except when it is clearly indicated that they are essential and when they are clearly considered to be essential in principle.

In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle.

In each of the above embodiments, when the shape, positional relationship or the like of the constituent elements of the embodiment is mentioned, the present disclosure should not be limited such a shape or positional relationship unless it is clearly stated that it is essential and/or it is required in principle.

What is claimed is:

1. A valve device comprising:
a valve that includes a valve outer peripheral portion, wherein the valve outer peripheral portion is shaped in a tubular form and forms a flow passage configured to conduct fluid at an inside of the valve outer peripheral portion, and the valve is configured to be rotated about a rotational axis in a circumferential direction of the valve outer peripheral portion;
a housing that receives the valve and has a fluid inlet, which is configured to receive the fluid, and a fluid outlet, which is configured to discharge the fluid, wherein the fluid inlet and the fluid outlet are placed to oppose the valve outer peripheral portion; and
a valve seat that is placed between the valve outer peripheral portion and the fluid outlet and is configured to close a gap between the valve outer peripheral portion and the fluid outlet, wherein:
the valve outer peripheral portion comprises the following components:
a valve inflow port which is placed to radially oppose the fluid inlet and is configured to supply the fluid, which is received from the fluid inlet, to the flow passage; and a plurality of valve outflow ports which are arranged one after another in the circumferential direction at an axial location of the valve outer peripheral portion opposed to the fluid outlet and are respectively configured to discharge the fluid, which is supplied into the flow passage, to the fluid outlet;

the valve seat has a seat opening that is formed at a seat surface of the valve seat while at least a portion of the seat surface is configured to slide along the valve outer peripheral portion when the valve is rotated, wherein the seat opening is configured to discharge the fluid to the fluid outlet when the seat opening is communicated with at least one of the plurality of valve outflow ports;

the valve is displaceable through rotation of the valve in the circumferential direction between a valve opening state, in which the at least one of the plurality of valve outflow ports is communicated with the seat opening, and a valve closing state, in which the plurality of valve outflow ports are not communicated with the seat opening;

the plurality of valve outflow ports include:
- a main outflow port which is configured to communicate with a whole of the seat opening in the valve opening state of the valve; and
- a plurality of intermediate outflow ports, each of which is configured to communicate with a portion of the seat opening in the valve opening state of the valve;

the plurality of intermediate outflow ports are arranged one after another in the circumferential direction, wherein an axial dimension of each of the plurality of intermediate outflow ports, which is measured in an axial direction of the rotational axis, is smaller than an axial dimension of the seat opening, which is measured in the axial direction, and the axial dimension of at least a portion of each of the plurality of intermediate outflow ports, which is placed to overlap with the seat opening in the circumferential direction, is progressively changed in the circumferential direction;

a predetermined one of the plurality of intermediate outflow ports is defined as one intermediate outflow port, and an adjacent one of the plurality of intermediate outflow ports, which is adjacent to the one intermediate outflow port, is defined as another intermediate outflow port, and an interval between a portion of the one intermediate outflow port and a portion of the another intermediate outflow port, which overlap with each other in the circumferential direction, is defined as an outflow port pitch; and a minimum value of the outflow port pitch is smaller than a circumferential dimension of the seat opening, which is measured in the circumferential direction at an axial location where the outflow port pitch is minimum.

2. The valve device according to claim 1, wherein the outflow port pitch between the one intermediate outflow port and the another intermediate outflow port is set such that in a state where the one intermediate outflow port and the another intermediate outflow port are communicated with the seat opening, when the valve is rotated, a communicating range between the another intermediate outflow port and the seat opening is decreased at a time when a communicating range between the one intermediate outflow port and the seat opening is increased, and the communicating range between the another intermediate outflow port and the seat opening is increased at a time when the communicating range between the one intermediate outflow port and the seat opening is decreased.

3. The valve device according to claim 2, wherein:
- the seat opening is shaped in a circle;
- the one intermediate outflow port and the another intermediate outflow port are respectively shaped in a circle;
- a size of an opening cross-sectional area of the one intermediate outflow port and a size of an opening cross-sectional area of the another intermediate outflow port are equal to each other;
- a center of the one intermediate outflow port and a center of the another intermediate outflow port overlap with a center of the seat opening in the circumferential direction; and
- a distance between the center of the one intermediate outflow port and the center of the another intermediate outflow port coincides with an inner diameter of the seat opening.

4. The valve device according to claim 1, wherein when an outer peripheral surface of the valve outer peripheral portion is unfolded into a plane, at least one of the plurality of intermediate outflow ports is shaped such that at least one of one end and another end of the intermediate outflow port, which are opposite to each other in the circumferential direction, extends in a direction that is perpendicular to the circumferential direction and a radial direction of the valve outer peripheral portion.

* * * * *